US012659996B2

(12) United States Patent
 Huang

(10) Patent No.: US 12,659,996 B2
(45) Date of Patent: Jun. 16, 2026

(54) METHODS AND DEVICES FOR SELECTIVE SUBCHANNEL TRANSMISSION OPERATION IN WIRELESS LOCAL AREA NETWORKS

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 321 days.

(21) Appl. No.: 18/510,387

(22) Filed: Nov. 15, 2023

(65) Prior Publication Data

US 2024/0090033 A1     Mar. 14, 2024

Related U.S. Application Data

(63) Continuation of application No. PCT/CN2022/080672, filed on Mar. 14, 2022.

(30) Foreign Application Priority Data

May 20, 2021     (SG) ............................ 10202105339S

(51) Int. Cl.
 *H04W 74/0816*     (2024.01)
 *H04L 1/00*     (2006.01)
 *H04W 84/12*     (2009.01)

(52) U.S. Cl.
 CPC ....... *H04W 74/0816* (2013.01); *H04L 1/0068* (2013.01); *H04W 84/12* (2013.01)

(58) Field of Classification Search
 CPC ............. H04W 74/0816; H04W 84/12; H04W 72/0453; H04W 74/006; H04L 1/0068; Y02D 30/70

(Continued)

(56) References Cited

U.S. PATENT DOCUMENTS

| | | | |
|---|---|---|---|
| 2017/0156112 | A1 | 6/2017 | Seok |
| 2019/0007180 | A1 | 1/2019 | Shi et al. |

(Continued)

FOREIGN PATENT DOCUMENTS

| | | |
|---|---|---|
| CN | 106102149 A | 11/2016 |
| CN | 110786068 A | 2/2020 |

(Continued)

OTHER PUBLICATIONS

IEEE P802.11ax TM/D8.0 ; Draft Standard for Information technology—Tele-communications and information exchange between systems Local and metropolitan area networks—Specific requirements ; Part 11: Wireless LAN Medium Access Control(MAC) and Physical Layer (PHY) Specifications ; Amendment 1: Enhancements for High Efficiency WLAN Oct. 2020.

(Continued)

*Primary Examiner* — Kwang B Yao
*Assistant Examiner* — Syed M Bokhari
(74) *Attorney, Agent, or Firm* — Ladas & Parry, LLP

(57)     ABSTRACT

Embodiments of the invention provide methods and devices for selective subchannel transmission (SST) operation in a WLAN. The method carried out by an access point (AP) comprises: setting, by the AP, a first target wake time (TWT) element of a TWT response to indicate at least one guaranteed non-punctured 20 MHz channel in a subchannel provided to a station (STA) as a temporary channel during a TWT service period (SP), and sending, by the AP, the TWT response to the STA to establish an individual TWT agreement between the AP and the STA. Embodiments of the invention also provide the method for SST operation in a WLAN carried out by the STA as well as the AP and STA for SST operation in a WLAN.

17 Claims, 10 Drawing Sheets

600A

Set a first TWT element of a TWT response to indicate at least one guaranteed non-punctured 20 MHz channel in a subchannel provided to an STA as a temporary channel during a TWT SP — 601A establish an individual TWT agreement between the AP and the STA — 602A

(58) Field of Classification Search
USPC .......................................................... 370/329
See application file for complete search history.

(56)                References Cited

U.S. PATENT DOCUMENTS

| | | | | |
|---|---|---|---|---|
| 2019/0174410 A1* | 6/2019 | Seok | ...................... | H04W 72/04 |
| 2019/0215037 A1 | 7/2019 | Seok et al. | | |
| 2019/0246354 A1* | 8/2019 | Huang | .............. | H04W 52/0229 |
| 2019/0261369 A1 | 8/2019 | Shi | | |
| 2020/0015219 A1 | 1/2020 | Asterjadhi et al. | | |
| 2020/0288439 A1 | 9/2020 | Seok et al. | | |
| 2021/0360521 A1* | 11/2021 | Seok | ................. | H04W 52/0203 |
| 2022/0303893 A1* | 9/2022 | Chu | ...................... | H04W 76/40 |

FOREIGN PATENT DOCUMENTS

| | | |
|---|---|---|
| CN | 111630786 A | 9/2020 |
| CN | 111654867 A | 9/2020 |
| CN | 111699650 A | 9/2020 |
| CN | 111713068 A | 9/2020 |
| CN | 112369109 A | 2/2021 |
| CN | 112689968 A | 4/2021 |
| WO | 2022242279 A1 | 11/2022 |

OTHER PUBLICATIONS

"EHT SST Operation", by Yongho Seok et al., Jul. 20, 2020.

"PHY-related agreements for SST", by Sigurd Schelstraete, Mar. 2, 2021.

International Search Report,International Application No. PCT/CN2022/080672, mailed Jun. 20, 2022.

Written Opinion of the International Searching Authority in International Application No. PCT/CN2022/080672, mailed Jun. 20, 2022 , with machine English translation provided by WIPO and by applicant's foreign counsel.

\* cited by examiner

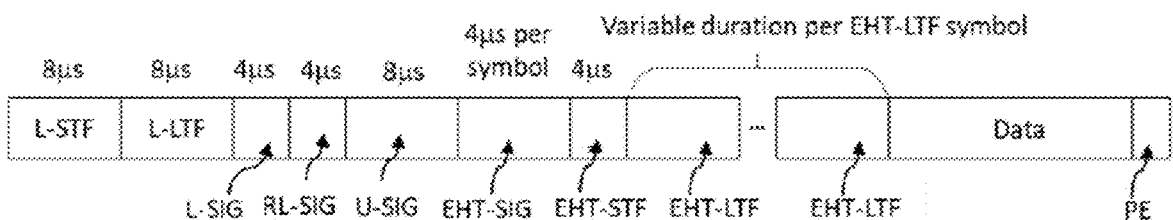

*Figure 1A*

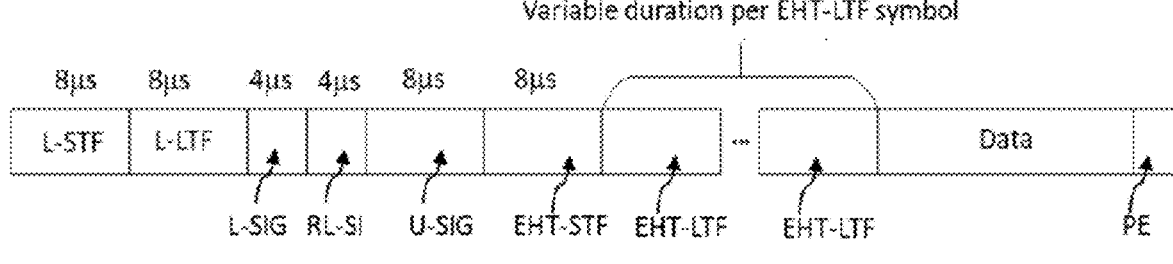

*Figure 1B*

| L-STF | L-LTF | L-SIG | RL-SIG | U-SIG2 | EHT-SIG2(CC2) |
|-------|-------|-------|--------|--------|---------------|
| L-STF | L-LTF | L-SIG | RL-SIG | U-SIG2 | EHT-SIG2(CC1) |
| L-STF | L-LTF | L-SIG | RL-SIG | U-SIG2 | EHT-SIG2(CC2) |
| L-STF | L-LTF | L-SIG | RL-SIG | U-SIG2 | EHT-SIG2(CC1) |
| L-STF | L-LTF | L-SIG | RL-SIG | U-SIG1 | EHT-SIG1(CC2) |
| L-STF | L-LTF | L-SIG | RL-SIG | U-SIG1 | EHT-SIG1(CC1) |
| L-STF | L-LTF | L-SIG | RL-SIG | U-SIG1 | EHT-SIG1(CC2) |
| L-STF | L-LTF | L-SIG | RL-SIG | U-SIG1 | EHT-SIG1(CC1) |

(2nd 80 MHz frequency subblock / 1st 80 MHz frequency subblock)

*Figure 1C*

| Element ID | Length | Element ID Extension | EHT Operation Information |
|------------|--------|----------------------|--------------------------|

Octets:        1          1                 1                        variable

*Figure 1D*

| Channel Width | CCFS | Disabled Subchannel Bitmap |
|---|---|---|

Octets:          1          1          0, 1 or 2

| Element | Length | Element ID Extension | EHT MAC Capabilities Information | EHT PHY Capabilities Information | Supported EHT-MCS And NSS Set | EHT PPE Thresholds (Optional) |
|---------|--------|----------------------|---------------------------------|---------------------------------|-------------------------------|------------------------------|

| NSEP Priority Access Supported | EHT OM Control Support | Triggered TXOP Sharing Support | EHT SST with Static Puncturing Support | EHT SST with Dynamic Puncturing Support | Reserved |
|--------------------------------|------------------------|--------------------------------|----------------------------------------|-----------------------------------------|----------|
| 1 | 1 | 1 | 1 | 1 | 3 |

Bits:

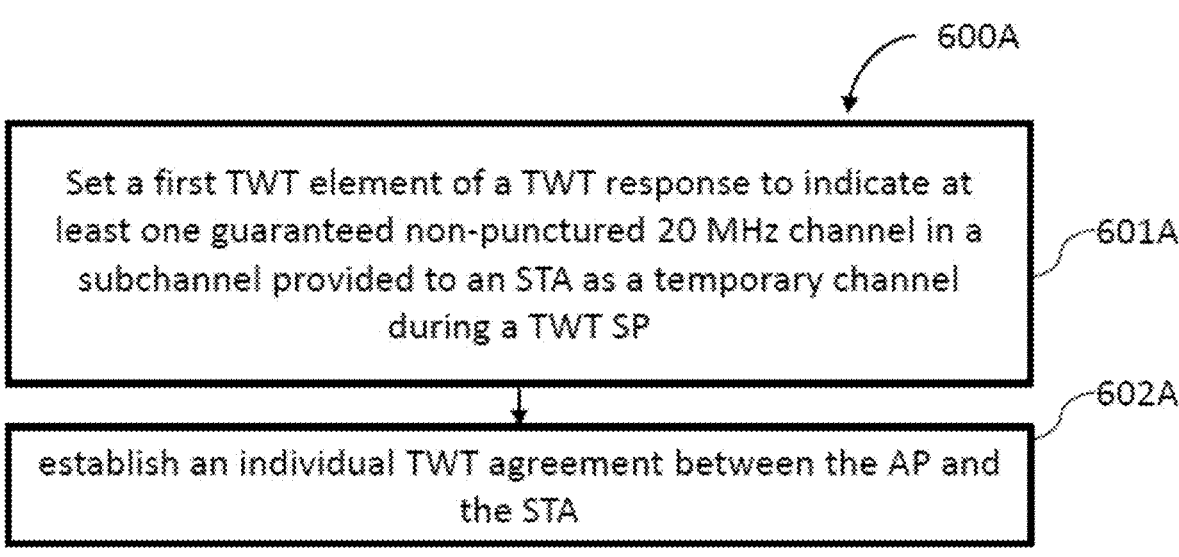

Set a first TWT element of a TWT response to indicate at least one guaranteed non-punctured 20 MHz channel in a subchannel provided to an STA as a temporary channel during a TWT SP establish an individual TWT agreement between the AP and the STA

*Figure 6A*

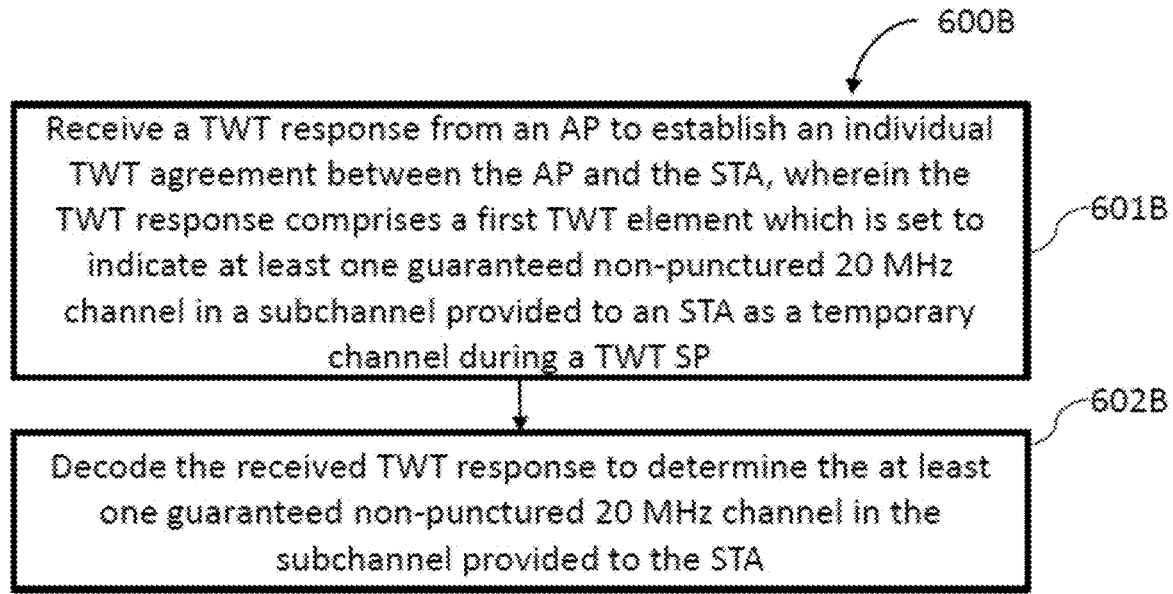

Receive a TWT response from an AP to establish an individual TWT agreement between the AP and the STA, wherein the TWT response comprises a first TWT element which is set to indicate at least one guaranteed non-punctured 20 MHz channel in a subchannel provided to an STA as a temporary channel during a TWT SP Decode the received TWT response to determine the at least one guaranteed non-punctured 20 MHz channel in the subchannel provided to the STA

| Order | Information |
|-------|-------------|
| 1 | Category |
| 2 | Unprotected S1G Action (6) |
| 3 | Dialog Token |
| 4 | One or two TWT elements |

*Figure 7A*

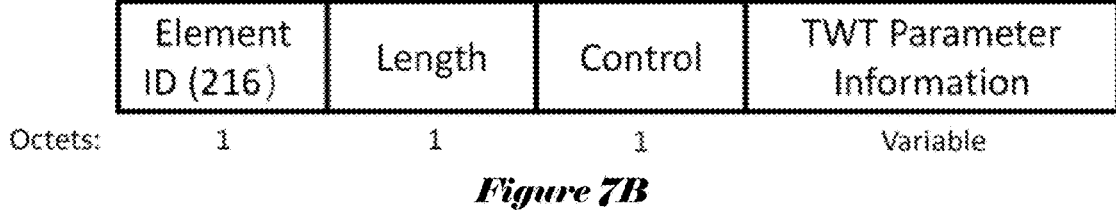

| Element ID (216) | Length | Control | TWT Parameter Information |
|------------------|--------|---------|--------------------------|

Octets:          1                1            1              Variable

*Figure 7B*

| NDP Paging Indicator (0) | Responder PM Mode | Negotiation Type (0) | TWT Information Frame Disabled | Wake Duration Unit | Reserved |
|--------------------------|-------------------|----------------------|-------------------------------|--------------------|----------|

Bits:          1                1                2                      1                        1            2

*Figure 7C*

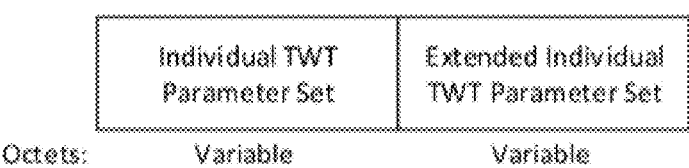

| Individual TWT Parameter Set | Extended Individual TWT Parameter Set |
|------------------------------|---------------------------------------|

Octets:          Variable                    Variable

*Figure 8A*

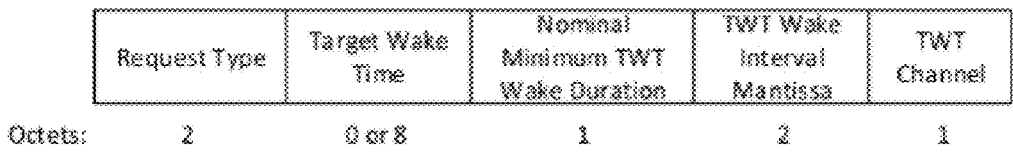

| Request Type | Target Wake Time | Nominal Minimum TWT Wake Duration | TWT Wake Interval Mantissa | TWT Channel |
|---|---|---|---|---|
| Octets: 2 | 0 or 8 | 1 | 2 | 1 |

*Figure 8B*

| TWT Request | TWT Setup Command | Trigger (1) | Implicit (1) | Flow Type | TWT Flow Identifier | TWT Wake Interval Exponent | TWT Protection |
|---|---|---|---|---|---|---|---|
| Bits: 1 | 3 | 1 | 1 | 1 | 3 | 5 | 1 |

*Figure 8C*

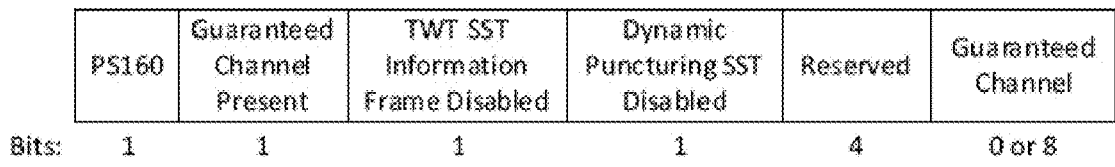

| PS160 | Guaranteed Channel Present | TWT SST Information Frame Disabled | Dynamic Puncturing SST Disabled | Reserved | Guaranteed Channel |
|---|---|---|---|---|---|
| Bits: 1 | 1 | 1 | 1 | 4 | 0 or 8 |

*Figure 8D*

| PS160 | Guaranteed Channel Present | TWT SST Information Frame Disabled | Reserved | Guaranteed Channel |
|---|---|---|---|---|
| Bits: 1 | 1 | 1 | 5 | 0 or 8 |

*Figure 8E*

| Order | Information |
|---|---|
| 1 | Category |
| 2 | Unprotected S1G Action |
| 3 | TWT SST Information |

*Figure 9A*

| TWT Flow Identifer | Response Request | Updated Guaranteed Channel Request | Updated Guaranteed Channel Presence | Number of TWT SPs | Updated Guaranteed Channel |
|---|---|---|---|---|---|
| 3 | 1 | 1 | 1 | 2 | 0 or 8 |

Bits:

METHODS AND DEVICES FOR SELECTIVE SUBCHANNEL TRANSMISSION OPERATION IN WIRELESS LOCAL AREA NETWORKS

CROSS REFERENCE

The present disclosure is a continuation-application of International (PCT) Patent Application No. PCT/CN2022/080672, filed on Mar. 14, 2022, which claims priority to Singapore Patent Application No. 10202105339S, filed on May 20, 2021, the entire contents of which are hereby incorporated by reference in their entirety.

TECHNICAL FIELD

The invention relates to resource allocation in an extremely high throughput (EHT) physical layer protocol data unit (PPDU) with large bandwidth in wireless communications, and more particularly to methods and devices for selective subchannel transmission (SST) operation in a wireless local area network (WLAN), especially methods and devices suitable for SST operation with dynamic puncturing.

BACKGROUND

Institute of Electrical and Electronics Engineers (IEEE) 802.11 TGbe is developing anew IEEE 802.11 amendment which defines EHT physical layer (PHY) and medium access control (MAC) layer capable of supporting a maximum throughput of at least 30 Gbps. To this end, it has been proposed to increase maximum channel bandwidth to 320 MHz, enable preamble puncturing for Orthogonal Frequency Division Multiple Access (OFDMA) and non-OFDMA transmissions and allow a resource unit (RU) or multiple resource unit (MRU) to be allocated to a single STA in an EHT PPDU. However, it is still an open issue to allocate RUs or MRUs in an EHT PPDU with large bandwidth, e.g., 320 MHz, in an efficient manner to maximize system throughput.

It would therefore be desirable to provide an effective and efficient mechanism/solution for resource unit allocation in an EHT PPDU with large bandwidth in a WLAN, especially in IEEE 802.11be EHT WLAN.

SUMMARY OF THE DISCLOSURE

According to a first aspect of the invention, various embodiments of the invention provide a first method for SST operation in a WLAN performed at an AP. The method may include: setting, by the AP, a first TWT element of a TWT response to indicate at least one guaranteed non-punctured 20 MHz channel in a subchannel provided to an STA as a temporary channel during a TWT SP, and sending, by the AP, the TWT response to the STA to establish an individual TWT agreement between the AP and the STA.

According to a second aspect of the invention, various embodiments of the invention provide a second method for SST operation in a WLAN performed at an STA. The method may include: receiving, by the STA, a TWT response from an AP to establish an individual TWT agreement between the AP and the STA, wherein the TWT response comprises a first TWT element which is set to indicate at least one guaranteed non-punctured 20 MHz channel in a subchannel provided to the STA as a temporary channel during a TWT SP, and decoding, by the STA, the received TWT response to determine the at least one guaranteed non-punctured 20 MHz channel in the subchannel provided to the STA.

According to a third aspect of the invention, various embodiments of the invention provide an AP for SST operation in a WLAN. The AP may comprise a memory to store instructions for performing the first method for SST operation in the WLAN, and a processor communicably coupled with the memory, the processor configured to execute the instructions to perform the first method for SST operation in a WLAN as described in various embodiments of the invention.

BRIEF DESCRIPTION OF THE DRAWINGS

The invention will be described in detail with reference to the accompanying drawings, in which:

FIG. 1A is a block diagram showing a format of an EHT MU PPDU according to various embodiments of the invention.

FIG. 1B is a block diagram showing a format of an EHT TB PPDU according to various embodiments of the invention.

FIG. 1C is a block diagram illustrating the pre-EHT modulated fields of a 160 MHz EHT MU PPDU transmitted to multiple STAs according to one embodiment of the invention.

FIG. 1D is a block diagram illustrating a format of an EHT Operation element according to some embodiments of the invention.

FIG. 6A is a flowchart illustrating a first method for SST operation in a WLAN carried out by an AP according to some embodiments of the invention.

FIG. 6B is a flowchart illustrating a second method for SST operation in a WLAN carried out by an STA according to some embodiments of the invention.

FIG. 7A is a diagram illustrating a format of the TWT Setup frame Action field according to some embodiments of the invention.

FIG. 7B is a block diagram illustrating a format of the TWT element according to some embodiments of the invention.

FIG. 7C is a block diagram illustrating a format of the Control field of the TWT element according to some embodiments of the invention.

FIG. 8A is a block diagram illustrating a format of the TWT Parameter Information field in all TWT elements during the individual TWT setup according to some embodiments of the invention.

FIG. 8B is a block diagram illustrating a format of the Individual TWT Parameter Set field as shown in FIG. 8A according to some embodiments of the invention.

FIG. 8C is a block diagram illustrating a format of the Request Type field as shown in FIG. 8B according to some embodiments of the invention.

FIG. 8D is a block diagram illustrating a format of the Extended Individual TWT Parameter Set field according to the first embodiment of the invention.

FIG. 8E is a block diagram illustrating a format of the Extended Individual TWT Parameter Set field according to the second embodiment.

FIG. 9A is a diagram illustrating a format of the TWT SST Information frame Action field according to some embodiments of the invention.

DETAILED DESCRIPTION

Figures 1E, 2A, 2B:
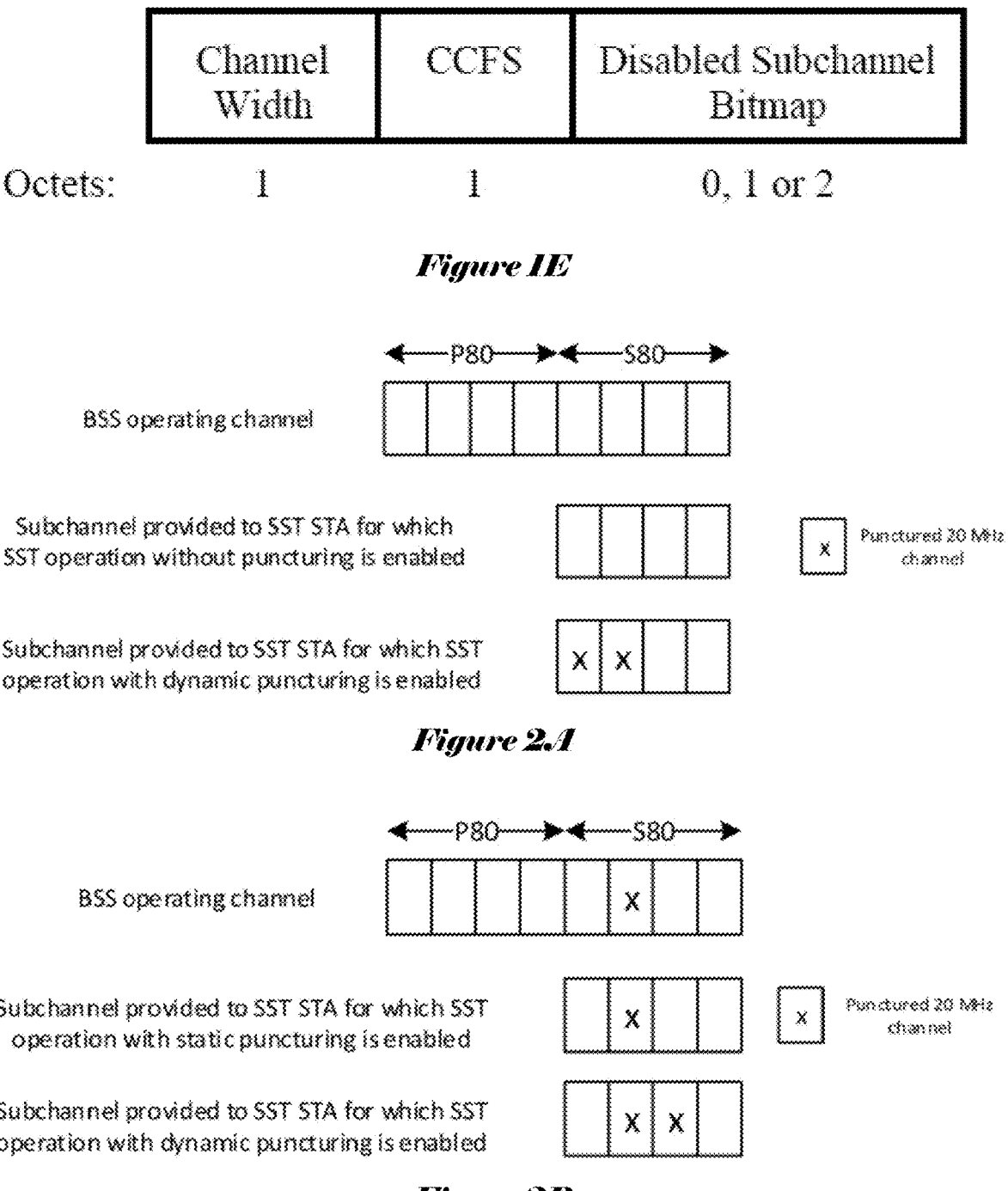
FIG. 1E is a block diagram illustrating a format of the EHT Operation Information field as shown in FIG. 1D according to some embodiments of the invention.
FIG. 2A is a schematic diagram illustrating a first example of subchannel provided to an 80 MHz operating SST STA as a temporary channel during a TWT SP in a 160 MHz BSS according to some embodiments of the invention.
FIG. 2B is a schematic diagram illustrating a second example of subchannel provided to an 80 MHz operating SST STA as a temporary channel during a TWT SP in a 160 MHz BSS according to some embodiments of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only and is not intended to limit the scope of the invention.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels and are not intended to impose numerical requirements on their objects. As used herein, the term "configured to" is interchangeable with "operative" or "adapted to".

In IEEE 802.11be WLAN, an EHT PPDU may have anyone of the following two formats: EHT MU PPDU and EHT TB PPDU. FIG. 1A is a block diagram showing a format of an EHT MU PPDU according to various embodiments of the invention. The EHT MU PPDU as shown in FIG. 1A is used for transmission to one or more users/STAs if the PPDU is not a response to a trigger frame from an AP. In an EHT MU PPDU, the Non-HT Short Training field (L-STF), Non-HT Long Training field (L-LTF), Non-HT Signal field (L-SIG), Repeated L-SIG (RL-SIG), Universal Signal field (U-SIG), and EHT Signal field (EHT-SIG) are called pre-EHT modulated fields while the EHT Short Training field (EHT-STF), EHT Long Training field (EHT-LTF), data field, and packet extension field (PE) are called EHT modulated fields. FIG. 1B is a block diagram showing a format of an EHT TB PPDU according to various embodiments of the invention. The EHT TB PPDU is used for a transmission that is a response to a trigger frame from an AP. In an EHT TB PPDU, the L-STF, L-LTF, L-SIG, RL-SIG, and U-SIG are called pre-EHT modulated fields while the EHT-STF, EHT-LTF, data field, and PE are called EHT modulated fields. The duration of the EHT-STF in the EHT TB PPDU is twice the duration of the EHT-STF in the EHT MU PPDU. For an EHT PPDU, each EHT-LTF symbol has the same GI (guard interval) duration as each data symbol, which is 0.8 μs, 1.6 μs, or 3.2 μs. The EHT-LTF comprises three types: 1×EHT-LTF, 2×EHT-LTF and 4×EHT-LTF. The duration of each 1×EHT-LTF, 2×EHT-LTF, or 4×EHT-LTF symbol without GI is 3.2 μs, 6.4 μs, or 12.8 μs. Each data symbol without GI is 12.8 μs.

FIG. 1C is a block diagram illustrating the pre-EHT modulated fields of a 160 MHz EHT MU PPDU transmitted to multiple STAs according to one embodiment of the invention. In this embodiment, the 160 MHz PPDU BW includes two 80 MHz frequency subblocks, and each 80 MHz frequency subblock has four 20 MHz subchannels. The U-SIG and/or EHT-SIG may carry different information for each of two 80 MHz frequency subblocks. The U-SIG in each 80 MHz frequency subblock is duplicated in every 20 MHz subchannel within the 80 MHz frequency subblock. The EHT-SIG in each 80 MHz frequency subblock includes two EHT-SIG content channels, i.e., CC1 and CC2. Referring to FIG. 1C, each of the two EHT-SIG content channels is duplicated in every other 20 MHz subchannel within the 80 MHz frequency subblock. In each 80 MHz frequency subblock, it is not allowed to puncture both of the two 20 MHz subchannels corresponding to a same EHT-SIG content channel simultaneously. The U-SIG in each 80 MHz frequency subblock contains channel puncturing information for the 80 MHz frequency subblock, which allows the STAs to properly decode the EHT-SIG in the 80 MHz frequency subblock.

In various embodiments of the invention, when an EHT MU PPDU is transmitted to multiple STAs, an STA only needs to process up to one 80 MHz frequency subblock of the pre-EHT modulated fields of the EHT MU PPDU to get all the assignment information for itself; and no 80 MHz frequency subblock change is needed while processing L-SIG, U-SIG, and EHT-SIG, which makes it possible to enable SST operation for STAs.

In various embodiments of the invention, an STA that supports SST operation is an SST STA and an AP that supports SST operation is an SST AP. An SST STA may be a 20 MHz operating STA, an 80 MHz operating STA, or a 160 MHz operating STA. A 20 MHz operating STA is an STA that is operating in 20 MHz channel width mode, such as a 20 MHz-only STA or an 80/160/320 MHz capable STA that has reduced its operating channel width to 20 MHz using operating mode indication (OMI). An 80 MHz operating STA is an STA that is operating in 80 MHz channel width mode, such as an 80 MHz capable STA or a 160/320 MHz capable STA that has reduced its operating channel width to 80 MHz using OMI. A 160 MHz operating STA is a STA that is operating in 160 MHz channel width mode, such as a 160 MHz capable STA or a 320 MHz capable STA that has reduced its operating channel width to 160 MHz using OMI.

In various embodiments of the invention, if basic service set (BSS) bandwidth is equal to or larger than 40 MHz, SST operation may be enabled for 20 MHz operating STAs, otherwise SST operation shall be disabled for 20 MHz operating STAs. If BSS bandwidth is equal to or larger than 160 MHz, SST operation may be enabled for 80 MHz operating STAs, otherwise SST operation shall be disabled for 80 MHz operating STAs. If BSS bandwidth is equal to 320 MHz, SST operation may be enabled for 160 MHz operating STAs, otherwise SST operation shall be disabled for 160 MHz operating STA.

Three SST Operation Modes

In various embodiments of the invention, an STA may be enabled for at least one of three possible SST operation modes: SST operation without puncturing, SST operation with static puncturing, and SST operation with dynamic puncturing. If a subchannel provided to an SST STA as a temporary channel during a TWT SP is a non-primary channel and does not include any punctured channel, SST operation without puncturing may be enabled for the SST STA. If the subchannel provided to an SST STA as a temporary channel during a TWT SP is a non-primary channel and may include at least one punctured channel which is not a non-punctured channel in the operating channel of a BSS with which the SST STA is associated, SST operation with static puncturing may be enabled for the SST STA. If the subchannel provided to an SST STA as a temporary channel during a TWT SP is a non-primary channel and may include at least one punctured channel which is a non-punctured channel in the operating channel of a BSS with which the SST STA is associated, SST operation with dynamic puncturing may be enabled for the SST STA.

In various embodiments of the invention, if SST operation without puncturing or SST operation with static puncturing is enabled for an SST STA, in an EHT PPDU transmitted to or from multiple STAs including the SST STA during a TWT SP, the puncturing pattern applied to the subchannel provided to the SST STA as a temporary channel during the TWT SP shall bealigned with the puncturing pattern for the operating channel of a BSS with which the SST STA is associated. However, if SST operation with dynamic puncturing is enabled for an SST STA, in an EHT PPDU transmitted to or from multiple STAs including the SST STA during a TWT SP, the puncturing pattern applied to the subchannel provided to the SST STA as a temporary channel during the TWT SP may not bealigned with the puncturing pattern for the operating channel of a BSS with which the SST STA is associated. Therefore, in some embodiments of the invention, when SST operation with dynamic puncturing is enabled for an 80 MHz operating SST STA or a 160 MHz operating SST STA, the STA may not be able to determine the exact channel puncturing pattern for the subchannel provided to the SST STA as a temporary channel during a TWT SP from the channel puncturing pattern for the operating channel of a BSS with which the SST STA is associated. To solve this problem, when receiving a 160 MHz or 320 MHz EHT MU PPDU during the TWT SP, at least one guaranteed non-punctured 20 MHz channel in at least one 80 MHz frequency subblock of the subchannel needs to be known by the SST STA so that the SST STA is able to decode the U-SIG to obtain the exact channel puncturing information for the at least one 80 MHz frequency subblock of the subchannel.

In various embodiments of the invention, the channel puncturing pattern for the operating channel of a BSS with which the SST STA is associated may be indicated in a most recently received information element by the SST STA. The information element which indicates the channel puncturing pattern for the BSS operating channel may be an EHT Operation element, which may be included in a Management frame such as a Beacon frame, a Probe Response frame, an Association Response frame, or a Reassociation Response frame.

FIG. 1D is a block diagram illustrating a format of an EHT Operation element according to some embodiments of the invention. As shown in FIG. 1D, the EHT Operation element may include an Element ID filed, a Length field, an Element ID Extension field and an EHT Operation Information field.

FIG. 1E is a block diagram illustrating a format of the EHT Operation Information field as shown in FIG. 1D according to some embodiments of the invention. As shown in FIG. 1E, the EHT Operation Information field may include a Channel Width subfield, a CCFS subfield, and a Disabled Subchannel Bitmap subfield. The Channel Width subfield may be set to indicate the BSS bandwidth, which may be 20 MHz, 40 MHz, 80 MHz, 160 MHz, or 320 MHz. The CCFS subfield may be set to indicate the channel center frequency index for the 20 MHz, 40 MHz, 80 MHz, 160 MHz, or 320 MHz BSS operating channel. The Disabled Subchannel Bitmap subfield may be set to indicate the channel puncturing pattern for the BSS operating channel, and the size of the Disabled Subchannel Bitmap subfield may depend on a setting of the Channel Width subfield. In one example, if the Channel Width subfield is set to indicate 20 MHz or 40 MHz BSS bandwidth, the Disabled Subchannel Bitmap subfield is not present in the EHT Operation Information field. If the Channel Width subfield is set to indicate 80 MHz or 160 MHz BSS bandwidth, the Disabled Subchannel Bitmap subfield may include an 8-bit bitmap with eight bits B0-B7. The 8-bit bitmap may be set to indicate which 20 MHz channel is punctured in the 80 MHz or 160 MHz BSS operating channel, where B0 may apply to the lowest frequency 20 MHz channel and B7 to the highest frequency 20 MHz channel. In some examples, for each of the bits B0-B7, a value of 1 may be used to indicate that the corresponding 20 MHz channel is punctured, and a value of 0 may be used otherwise. In terms of 80 MHz BSS bandwidth, each of the bits B4-B7 may be reserved or set to 1. If the Channel Width subfield is set to indicate 320 MHz BSS bandwidth, the Disabled Subchannel Bitmap subfield may include a 16-bit bitmap with 16 bits B0-B15. The 16-bit bitmap is set to indicate which 20 MHz channel is punctured in the 320 MHz BSS operating channel, where B0 may be applied to the lowest frequency 20 MHz channel and B15 to the highest frequency 20 MHz channel. In some examples, for each of the bits B0-B15, a value of 1 may be used to indicate that the corresponding 20 MHz channel is punctured, and a value of 0 may be used otherwise.

In various embodiments of the invention, the channel puncturing pattern for a 160 MHz BSS operating channel may satisfy the following requirements: the 160 MHz BSS operating channel with the primary 80 MHz channel (P80) and secondary 80 MHz channel (S80) may include one punctured 20 MHz channel or one punctured 40 MHz channel.

FIG. 2A is a schematic diagram illustrating a first example of subchannel provided to an 80 MHz operating SST STA as a temporary channel during a TWT SP in a 160 MHz BSS according to some embodiments of the invention. In this example, the 160 MHz BSS operating channel does not include punctured channel in S80. In this case, it is impossible to enable SST operation with static puncturing for the SST STA, but it is possible to enable SST operation without puncturing or SST operation with dynamic puncturing for the SST STA. When the subchannel provided to the SST STA is in S80 and does not include punctured channel, SST operation without puncturing is enabled for the SST STA. When the subchannel provided to the SST STA is in S80 and includes one or two punctured 20 MHz channels which are non-punctured channels in the 160 MHz BSS operating channel, SST operation with dynamic puncturing is enabled for the SST STA. If the subchannel provided to the SST STA includes two punctured 20 MHz channels, the two punctured 20 MHz channels shall not correspond to a same EHT-SIG content channel in an EHT MU PPDU.

FIG. 2B is a schematic diagram illustrating a second example of subchannel provided to an 80 MHz operating SST STA as a temporary channel during a TWT SP in a 160 MHz BSS according to some embodiments of the invention. In this example, the 160 MHz BSS operating channel includes one punctured 20 MHz channel in S80. In this case, it is impossible to enable SST operation without puncturing for the SST STA, but it is possible to enable SST operation with static or dynamic puncturing for the SST STA. When the subchannel provided to the SST STA is in S80 and includes one punctured 20 MHz channel which is not a non-punctured channel in the 160 MHz BSS operating channel, SST operation with static puncturing is enabled for the SST STA. When the subchannel provided to the SST STA is in S80 and includes one punctured 20 MHz channel which is a non-punctured 20 MHz channel in the 160 MHz BSS operating channel, SST operation with dynamic puncturing is enabled for the SST STA. If the subchannel provided to the SST STA include two punctured 20 MHz channels, the two punctured 20 MHz channels shall not correspond to a same EHT-SIG content channel in an EHT MU PPDU.

Figures 2C, 3A, 3B:
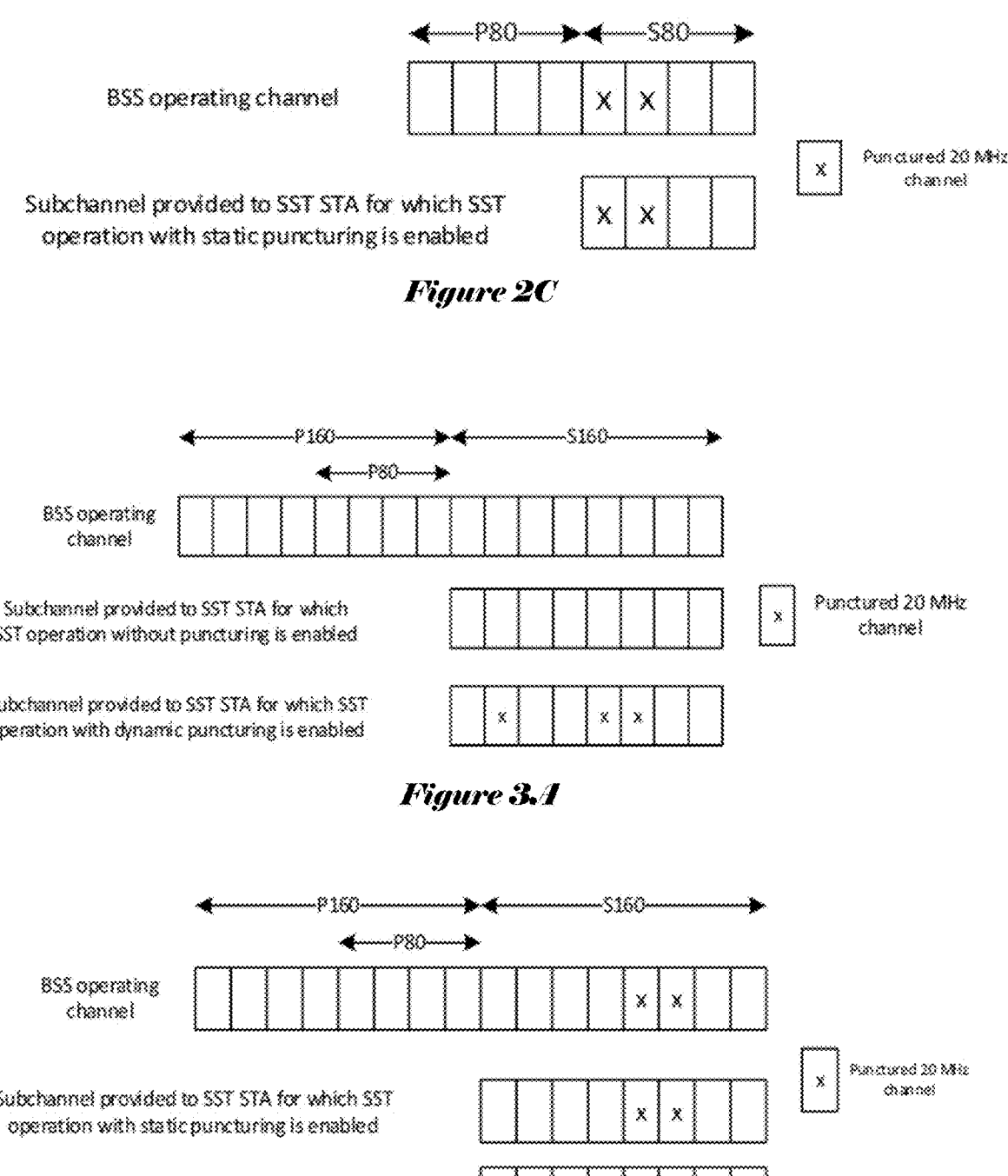
FIG. 2C is a schematic diagram illustrating a third example of subchannel provided by an 80 MHz operating SST STA as a temporary channel during a TWT SP in a 160 MHz BSS according to some embodiments of the invention.
FIG. 3A is a schematic diagram illustrating a first example of subchannel provided to a 160 MHz operating SST STA as a temporary channel during a TWT SP in a 320 MHz BSS according to some embodiments of the invention.
FIG. 3B is a schematic diagram illustrating a second example of subchannel provided to a 160 MHz operating SST STA as a temporary channel during a TWT SP in a 320 MHz BSS according to some embodiments of the invention.

FIG. 2C is a schematic diagram illustrating a third example of subchannel provided to an 80 MHz operating SST STA as a temporary channel during a TWT SP in a 160 MHz BSS according to some embodiments of the invention. In this example, the 160 MHz BSS operating channel includes one punctured 40 MHz channel in S80. In this case, it is impossible to enable SST operation without puncturing or SST operation with dynamic puncturing for the SST STA, but it is possible to enable SST operation with static puncturing for the SST STA. When the subchannel provided to the SST STA is in S80 and includes one punctured 40 MHz channel which is not a non-punctured channel in the 160 MHz BSS operating channel, SST operation with static puncturing is enabled for the SST STA.

In various embodiments of the invention, the channel puncturing pattern for a 320 MHz BSS operating channel may satisfy the following requirements: the 320 MHz BSS operating channel with the primary 160 MHz channel (P160) and the secondary 160 MHz channel (S160) may include one punctured 40 MHz channel, or one punctured 80 MHz channel, or both.

FIG. 3A is a schematic diagram illustrating a first example of subchannel provided to a 160 MHz operating SST STA as a temporary channel during a TWT SP in a 320 MHz BSS according to some embodiments of the invention. In this example, the 320 MHz BSS operating channel does not include punctured channel in S160. In this case, it is impossible to enable SST operation with static puncturing for the SST STA, but it is possible to enable SST operation without puncturing or SST operation with dynamic puncturing for the SST STA. When the subchannel provided to the SST STA is in S160 and does not include punctured channel, SST operation without puncturing is enabled for the SST STA. When the subchannel provided to the SST STA is in S160 and includes one or two punctured 20 MHz channels, which are non-punctured channels in the 320 MHz BSS operating channel, in at least one of two 80 MHz frequency subblocks, SST operation with dynamic puncturing is enabled for the SST STA. If the subchannel provided to the SST STA includes two punctured 20 MHz channels in one 80 MHz frequency subblock, the two punctured 20 MHz channels shall not correspond to a same EHT-SIG content channel.

FIG. 3B is a schematic diagram illustrating a second example of subchannel provided to a 160 MHz operating SST STA as a temporary channel during a TWT SP in a 320 MHz BSS according to some embodiments of the invention. In this example, the 320 MHz BSS operating channel includes one punctured 40 MHz or 80 MHz channel in S160. In this case, it is impossible to enable SST operation without puncturing for the SST STA, but it is possible to enable SST operation with static or dynamic puncturing for the SST STA. When the subchannel provided to the SST STA is in S160 and includes one punctured 40 or 80 MHz channel which is not a non-punctured channel in the 320 MHz BSS operating channel, SST operation with static puncturing is enabled for the SST STA. When the subchannel provided to the SST STA is in S160 and includes one or two punctured 20 MHz channels which are non-punctured channels in the 320 MHz BSS operating channel, SST operation with dynamic puncturing is enabled for the SST STA. If the subchannel provided to the SST STA includes two punctured 20 MHz channels in one 80 MHz frequency subblock, the two punctured 20 MHz channels shall not correspond to a same EHT-SIG content channel.

Figures 3C, 4, 5A, 5B:
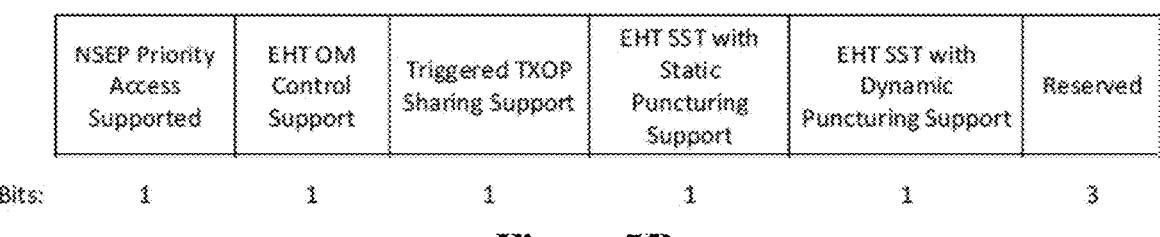
FIG. 3C is a schematic diagram illustrating a third example of subchannel provided to a 160 MHz operating SST STA as a temporary channel during a TWT SP in a 320 MHz BSS according to some embodiments of the invention.
FIG. 4 is a schematic diagram illustrating an example of subchannel provided to an 80 MHz operating SST STA as a temporary channel during a TWT SP in a 320 MHz BSS according to some embodiments of the invention.
FIG. 5A is a block diagram illustrating a format of the EHT Capabilities element according to some embodiments of the invention.
FIG. 5B illustrated a format of the EHT MAC Capabilities Information field as shown in FIG. 5A.

FIG. 3C is a schematic diagram illustrating a third example of subchannel provided to a 160 MHz operating SST STA as a temporary channel during a TWT SP in a 320 MHz BSS according to some embodiments of the invention. In this example, the 320 MHz BSS operating channel includes one punctured 40 MHz channel and one punctured 80 MHz channel in S160. In this case, it is impossible to enable SST operation without puncturing or with dynamic puncturing for the SST STA, but it is possible to enable SST operation with static puncturing for the SST STA. When the subchannel provided to the SST STA is in S160 and includes one punctured 40 MHz channel and one punctured 80 MHz channel which are not non-punctured channels in the 320 MHz BSS operating channel, SST operation with static puncturing is enabled for the SST STA.

FIG. 4 is a schematic diagram illustrating an example of subchannel provided to an 80 MHz operating SST STA as a temporary channel during a TWT SP in a 320 MHz BSS according to some embodiments of the invention. In this example, the 320 MHz BSS operating channel has the lowest 80 MHz of P160 and the lower 40 MHz of S160 punctured. In this case, it is possible to enable SST operation without puncturing or with static or dynamic puncturing for the SST STA. When the subchannel provided to the SST STA is in a non-primary 80 MHz channel and does not include punctured channel, SST operation without puncturing is enabled for the SST STA. When the subchannel provided to the SST STA is in a non-primary 80 MHz channel and includes one or two punctured 20 MHz channels which are non-punctured channels in the 320 MHz BSS operating channel, SST operation with dynamic puncturing is enabled for the SST STA. When the subchannel provided to the SST STA is in a non-primary 80 MHz channel and includes one punctured 40 MHz channel which is not a non-punctured channel in the 320 MHz BSS operating channel, SST operation with static puncturing is enabled for the SST STA. When the subchannel provided to the SST STA include two punctured 20 MHz channels, the two punctured 20 MHz channels shall not correspond to a same EHT-SIG content channel.

It should be noted that the various examples of a subchannel provided to an SST STA as shown in FIGS. 2-4 may also be used to illustrate various examples of a subchannel proposed by an SST STA according to some embodiments of the invention.

SST Operation Capability Declaration

In various embodiments of the invention, SST STAs may have different capabilities for supporting SST operation. An SST STA may declare its capability for supporting SST operation in an HE Capabilities element and an EHT Capabilities element which are included in a Probe Request frame, an Association Request frame or a Reassociation Request frame transmitted by the SST STA. Similarly, SST APs may have different capabilities for supporting SST operation. An SST AP may declare its capability for supporting SST operation in an HE Capabilities element and an EHT Capabilities element which are included in a Beacon frame, a Probe Response frame, an Association Response frame, or a Reassociation Response frame transmitted by the SST AP. Alternatively, an SST AP may be able to support all the three SST operation modes.

In some embodiments of the invention, the HE Capabilities element may include an HE Subchannel Selective Transmission Support field in an HE MAC Capabilities Information field, which indicates whether SST operation without puncturing is supported. For example, the HE Subchannel Selective Transmission Support field may be set to 1 to indicate SST operation without puncturing is supported; and set to 0 otherwise. FIG. 5A is a block diagram illustrating a format of the EHT Capabilities element according to some embodiments of the invention. The EHT Capabilities element may include an EHT MAC Capabilities Information field. FIG. 5B illustrated a format of the EHT MAC Capabilities Information field as shown in FIG. 5A. The EHT MAC Capabilities Information field may include an EHT SST with Static Puncturing Support field and an EHT SST with Dynamic Puncturing Support field. The EHT SST with Static Puncturing Support field may be set to indicate whether SST operation with static puncturing is supported. For example, the EHT SST with Static Puncturing Support field may be set to 1 to indicate SST operation with static puncturing is supported; and set to 0 otherwise. The EHT SST with Dynamic Puncturing Support field may be set to indicate whether SST operation with dynamic puncturing is supported. For example, the EHT SST with Dynamic Puncturing Support field may be set to 1 to indicate SST operation with dynamic puncturing is supported; and set to 0 otherwise.

In various embodiments of the invention, if an SST STA or an SST AP declares it supports SST operation with dynamic puncturing, it shall declare support of both SST operation without puncturing and SST operation with static puncturing. If an SST STA or an SST AP declares it supports SST operation with static puncturing, it shall declare support of SST operation without puncturing. If an SST STA or an SST AP declares it does not support SST operation without puncturing, it shall declare support of neither SST operation with static puncturing nor SST operation with dynamic puncturing.

In various embodiments of the invention, an STA and an AP may set up SST operation by negotiating an individual trigger-enabled TWT SP. FIG. 6A is a flowchart illustrating a first method 600A for SST operation in a WLAN carried out by an AP according to some embodiments of the invention.

At Block 601A, a first TWT element of a TWT response, i.e., a TWT Setup frame with a TWT response, is set by the AP to indicate at least one guaranteed non-punctured 20 MHz channel in a subchannel provided to an STA as a temporary channel during a TWT SP.

At Block 602A, the TWT response is sent by the AP to the STA to establish an individual TWT agreement between the AP and the STA.

With this method, the STA is able to determine the at least one guaranteed non-punctured 20 MHz channel in the subchannel provided to the STA as a temporary channel during a TWT SP based on the received TWT response. Thus, an exact channel puncturing pattern of the subchannel provided to the STA may be determined by the STA based on the first TWT element in the TWT response.

In some embodiments, a first field, e.g., a Guaranteed Channel field, in a TWT Parameter Information field of the first TWT element may be set to indicate the at least one guaranteed non-punctured 20 MHz channel in the subchannel provided to the STA.

In some embodiments, the first field may be set to indicate the at least one guaranteed non-punctured 20 MHz channel in at least one 80 MHz frequency subblock in the subchannel provided to the STA. In one example, the first field may be set to indicate the at least one guaranteed non-punctured 20 MHz channel in each 80 MHz frequency subblock in the subchannel provided to the STA. In some examples, the first field may be set to indicate the at least one guaranteed non-punctured 20 MHz channel in only one 80 MHz frequency subblock in the subchannel.

In some embodiments, a second field, e.g., a Guaranteed Channel Present field, may be set in the TWT Parameter Information field of the first TWT element to indicate whether the first field is set or present in the first TWT element.

In some embodiments, the second field may be set to indicate that the first field is not set or present in the first TWT element if an SST operation with dynamic puncturing is disabled for the STA. In one embodiment, the second field may be set to indicate that the first field is set in the first TWT element if the SST operation with dynamic puncturing is enabled for the STA, and set to indicate that the first field is not set in the first TWT element if an SST operation with dynamic puncturing is disabled for the STA.

Alternatively, in another embodiment, even if the SST operation with dynamic puncturing is enabled for the STA, the second field may be set to indicate that the first field is not set in the first TWT element. In this embodiment, the second field may be set to indicate that the first field is not set or present in the first TWT element if the SST operation with dynamic puncturing is enabled for the STA and any of the following requirements (A) and (B) is satisfied: (A) if the STA is an 80 MHz operating STA, the subchannel provided to the STA as the temporary channel during the TWT SP comprises one punctured 20 MHz channel which is not a non-punctured channel in an operating channel of a 160 MHz BSS or a 320 MHz BSS with which the STA is associated, and (B) if the STA is a 160 MHz operating STA, the subchannel provided to the STA as the temporary channel during the TWT SP comprises one punctured 40 MHz channel which is not a non-punctured channel in an operating channel of a 320 MHz BSS with which the STA is associated.

In some embodiments, a third field, e.g., a dynamic puncturing SST disabled field, in the TWT Parameter Information field of the first TWT element may be set to indicate whether the SST operation with dynamic puncturing is disabled for the STA. When the third field is set to indicate that SST operation with dynamic puncturing is disabled for the STA, the second field is set to indicate that the first field is not set or present in the first TWT element. When the third field is set to indicate that SST operation with dynamic puncturing is enabled for the STA, the second field may be set to indicate that the first field is not present in the first TWT element if any of the requirements (A) and (B) mentioned above is satisfied.

In some embodiments, the AP may determine that the SST operation with dynamic puncturing is disabled for the STA if any of the following requirements is satisfied: (a) neither of the AP nor the STA supports the SST operation with dynamic puncturing, (b) the subchannel provided to the STA as the temporary channel during the TWT SP is a primary channel, (c) if the STA is an 80 MHz operating STA, the subchannel provided to the STA as the temporary channel during the TWT SP is a non-primary channel and comprises one punctured 40 MHz channel which is not a non-punctured channel in an operating channel of a 160 MHz BSS or a 320 MHz BSS with which the STA is associated, and (d) if the STA is a 160 MHz operating STA, the subchannel provided to the STA as the temporary channel during the TWT SP is a non-primary channel and comprises one punctured 40 MHz channel and one punctured 80 MHz channel which are not non-punctured channels in a 320 MHz BSS with which the STA is associated.

In some embodiments, the method may further include: a first frame, e.g., a TWT SST Information frame, is generated by the AP to indicate updated SST operation information for the individual TWT agreement between the AP and the STA, wherein the updated SST operation information comprises at least one updated guaranteed non-punctured 20 MHz channel which will be used in a predetermined subsequent TWT SP, and sending, by the AP, the first frame to the STA.

In some embodiments, the method may further include: a second frame, e.g., a TWT SST Information frame from the STA which indicates proposed updated SST operation information for the individual TWT agreement between the AP and the STA, is received by the AP, wherein the proposed updated SST operation information comprises at least one updated guaranteed non-punctured 20 MHz channel which is proposed by the STA to be used in a predetermined subsequent TWT SP. The predetermined subsequent TWT SP may be a TWT SP immediately after the current TWT SP or a TWT SP after a predetermined number of TWT SPs from the current TWT SP.

In some embodiments, a fourth field, e.g., a TWT SST Information Frame Disabled field, may be set in the TWT Parameter Information field of the first TWT element to indicate whether the AP supports reception of the second frame from the STA.

In some embodiments, to enable the AP to declare its capabilities for different SST operation modes, a first capabilities field, e.g., the EHT MAC Capabilities Information field, may be set in an HE Capabilities element by the AP to indicate whether an SST operation without puncturing is supported by the AP; a second capabilities field, e.g., the EHT SST with Static Puncturing Support field, may be set in an EHT Capabilities element to indicate whether an SST operation with static puncturing is supported by the AP, and a third capabilities field, e.g., the EHT SST with Dynamic Puncturing Support field, may be set in the EHT Capabilities element to indicate whether an SST operation with dynamic puncturing is supported by the AP.

In some embodiments, the HE Capabilities element and the EHT Capabilities element may be included in a Beacon frame, a Probe Response frame, an Association Response frame or a Reassociation Response frame transmitted by the AP.

In some embodiments of the invention, if the third capabilities field is set to indicate that the SST operation with dynamic puncturing is supported by the AP, the first capabilities field and the second capabilities field may be set to indicate that the SST operation without puncturing and the SST operation with static puncturing are supported by the AP respectively; or if the second capabilities field is set to indicate that the SST operation with static puncturing is supported by the AP, the first capabilities field may be set to indicate that the SST operation without puncturing is supported by the AP.

It should be noted that in some embodiments, the TWT response may be an unsolicited TWT response, i.e., the individual TWT agreement between the AP and the STA may be established by an unsolicited TWT response from the AP to the STA. However, in some other embodiments, the TWT response may be set and sent to the STA after receiving a TWT request from the STA. Specifically, the first method 600A may further comprise: before setting the first TWT element of the TWT response, a TWT request from the STA to request for establishing the individual TWT agreement between the AP and the STA is received by the AP, wherein the TWT request may include a second TWT element which is set to indicate at least one guaranteed non-punctured 20 MHz channel in a subchannel proposed by the STA as the temporary channel during the TWT SP, then the received TWT request is decoded by the AP to determine the at least one guaranteed non-punctured 20 MHz channel in the subchannel proposed by the STA, and the at least one guaranteed non-punctured 20 MHz channel in the subchannel provided to the STA may be further determined based on the received TWT request, i.e., at least one guaranteed non-punctured 20 MHz channel in a subchannel proposed by the STA.

In some embodiments, the step of decoding the received TWT request may include: a first field, e.g., a Guaranteed Channel field, in a TWT Parameter Information field of the second TWT element is decoded by the AP to determine the at least one guaranteed non-punctured 20 MHz channel in the subchannel proposed by the STA.

In some embodiments, the step of decoding the first field may further include: the first field is decoded by the AP to determine the at least one guaranteed non-punctured 20 MHz channel in at least one 80 MHz frequency subblock in the subchannel proposed by the STA.

In some embodiments, before decoding the first field, the method may further include: a second field, e.g., a Guaranteed Channel Present field, in the TWT Parameter Information field of the second TWT element is decoded to determine whether the first field is set or present in the second TWT element.

In some embodiments, before decoding the second field, the method may further include: a third field in the TWT Parameter Information field of the second TWT element is decoded by the AP to determine whether an SST operation with dynamic puncturing is disabled for the STA, wherein the step of decoding the second field further include: the second field is decoded by the AP to determine whether the first field is present in the second TWT element if the third field is set to indicate that the SST operation with dynamic puncturing is enabled for the STA.

FIG. 6B is a flowchart illustrating a second method 600B for SST operation in a WLAN carried out by an STA according to some embodiments of the invention.

At Block 601B, a TWT response from an AP is received by the STA to establish an individual TWT agreement between the AP and the STA, wherein the TWT response comprises a first TWT element which is set to indicate at least one guaranteed non-punctured 20 MHz channel in a subchannel provided to the STA as a temporary channel during a TWT SP.

At Block 602B, the received TWT response is decoded by the STA to determine the at least one guaranteed non-punctured 20 MHz channel in the subchannel provided to the STA.

In some embodiments, the step of decoding the received TWT response may include: a first field in a TWT Parameter Information field of the second TWT element is decoded by the STA to determine the at least one guaranteed non-punctured 20 MHz channel in the subchannel provided to the STA.

In some embodiments, the step of decoding the first field may further include: the first field is decoded by the STA to determine the at least one guaranteed non-punctured 20 MHz channel in at least one 80 MHz frequency subblock in the subchannel provided to the STA.

In some embodiments, the method may further include: before decoding the first field, a second field in the TWT Parameter Information field of the first TWT element is decoded by the STA to determine whether the first field is set in the first TWT element.

In some embodiments, the method may further include: before decoding the second field, a third field in the TWT Parameter Information field of the first TWT element is decoded by the STA to determine whether an SST operation with dynamic puncturing is disabled for the STA, wherein the step of decoding the second field may further include: the second field is decoded to determine whether the first field is present in the first TWT element if the third field is set to indicate that the SST operation with dynamic puncturing is enabled for the STA.

It should be noted that in some embodiments, the TWT response may be an unsolicited TWT response, i.e., the individual TWT agreement between the AP and the STA may be established by an unsolicited TWT response from the AP to the STA. However, in other embodiments, the TWT response may be set and sent to the STA after receiving a TWT request from the STA. Specifically, the second method 600B may further comprise: before receiving the TWT response from the AP, a second TWT element of a TWT request is set by the STA to indicate at least one guaranteed non-punctured 20 MHz channel in a subchannel proposed by the STA as the temporary channel during the TWT SP, and the TWT request is sent by the STA to the AP to request for establishing the individual TWT agreement between the AP and the STA.

In some embodiments, the step of setting the second TWT element may include: a first field is set in a TWT Parameter Information field of the second TWT element by the STA to indicate the at least one guaranteed non-punctured 20 MHz channel in the subchannel proposed by the STA.

In some embodiments, the step of setting the second TWT element may further include: the first field is set by the STA to indicate the at least one guaranteed non-punctured 20 MHz channel in at least one 80 MHz frequency subblock in the subchannel proposed by the STA.

In some embodiments, the method may further include: a second field is set in the TWT Parameter Information field of the second TWT element to indicate whether the first field is set in the second TWT element.

In some embodiments, the step of setting the second TWT element may further include: the second field in the TWT Parameter Information field of the second TWT element is set to indicate that the first field is not set in the second TWT element if an SST operation with dynamic puncturing is disabled for the STA. In one embodiment, the second field may be set to indicate that the first field is set in the second TWT element if an SST operation with dynamic puncturing is enabled for the STA, and set to indicate that the first field is not set in the second TWT element if an SST operation with dynamic puncturing is disabled for the STA.

Alternatively, in another embodiment, even if the SST operation with dynamic puncturing is enabled for the STA, the second field may also be set to indicate that the first field is not set in the second TWT element. In this embodiment, the step of setting the second TWT element may further include: the second field in the TWT Parameter Information field of the second TWT element is set to indicate that the first field is not set in the second TWT element if the SST operation with dynamic puncturing is enabled for the STA and any of the requirements (A) and (B) mentioned above is satisfied.

In some embodiments, the method may further include: a third field in the TWT Parameter Information field of the second TWT element is set by the STA to indicate whether the SST operation with dynamic puncturing is disabled for the STA.

In some embodiments, the method may further include: the STA determines that the SST Operation with dynamic puncturing is disabled for the STA if any of the requirements (a) to (d) mentioned above is satisfied.

In some embodiments, the method may further include: a first frame is received by the STA from the AP which indicates updated SST operation information for the individual TWT agreement between the AP and the STA, wherein the updated SST operation information includes at least one updated guaranteed non-punctured 20 MHz channel which will be used in a predetermined subsequent TWT SP, and the received first frame is decoded by the STA to determine the updated SST operation information.

In some embodiments, the step of setting the second TWT element may further include: a fourth field in the TWT Parameter Information field of the second TWT element is set to indicate whether the STA supports reception of the first frame from the AP.

In some embodiments, the method may further include: a second frame is generated by the STA to indicate proposed updated SST operation information for the individual TWT agreement between the AP and the STA, wherein the proposed updated SST operation information includes at least one updated guaranteed non-punctured 20 MHz channel which is proposed by the STA to be used in a predetermined subsequent TWT SP, and the second frame is sent to the AP by the STA.

To declare the SST operation capabilities of the STA, the method may further include: a first capabilities field is set by the STA in an HE Capabilities element to indicate whether an SST operation without puncturing is supported by the STA; a second capabilities field is set by the STA in an EHT Capabilities element to indicate whether an SST operation with static puncturing is supported by the STA, and a third capabilities field is set by the STA in the EHT Capabilities element to indicate whether an SST operation with dynamic puncturing is supported by the STA.

In some embodiments, the HE Capabilities element and the EHT Capabilities element may be included in a Probe Request frame, an Association Request frame or a Reassociation Request frame transmitted by the STA.

In some embodiments, if the third capabilities field is set to indicate that the SST operation with dynamic puncturing is supported by the STA, the first capabilities field and the second capabilities field are set to indicate that the SST operation without puncturing and the SST operation with static puncturing are supported by the STA respectively; or if the second capabilities field is set to indicate that the SST operation with static puncturing is supported by the STA, the first capabilities field is set to indicate that the SST operation without puncturing is supported by the STA.

Figure 6C:
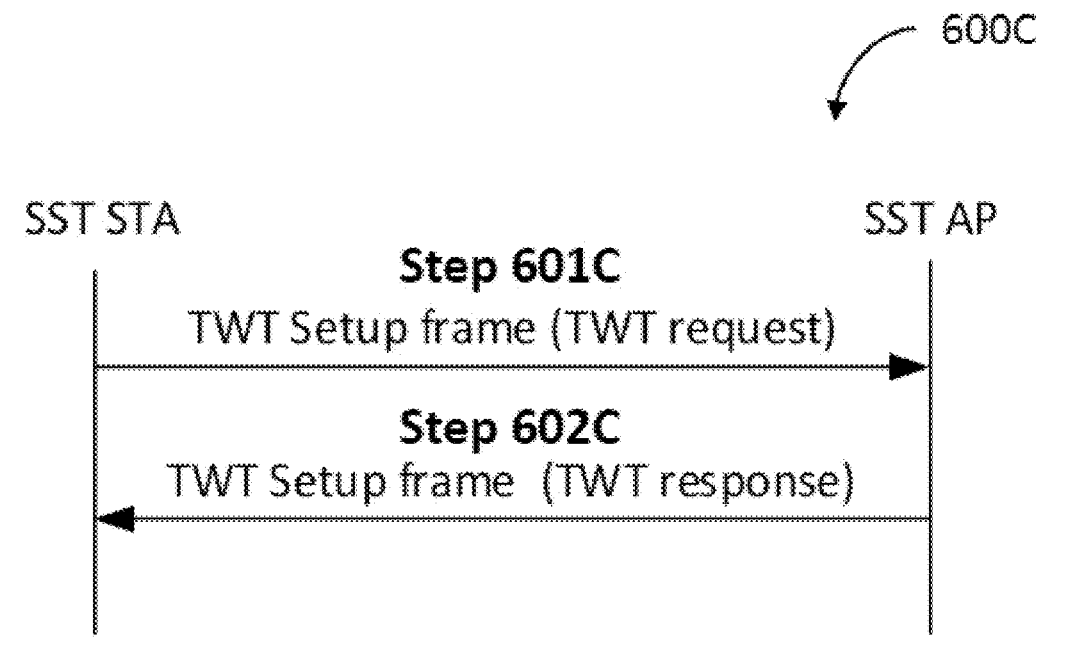
FIG. 6C is a schematic diagram illustrating a method for establishing an individual TWT agreement between an STA and an AP according to some embodiments of the invention.

FIG. 6C is a schematic diagram illustrating a method 600C for establishing an individual TWT agreement between an STA and an AP according to some embodiments of the invention. It should be noted that the STA and AP in these embodiments are SST STA and SST AP.

At Step 601C, the STA transmits a TWT request, i.e., a TWT Setup frame with a TWT request, to the AP. The TWT request may include a set of preferred TWT parameters for a trigger-enabled TWT SP, e.g., a future individual TWT SP start time, an interval between individual TWT SPs, a minimum duration of an individual TWT SP, and a subchannel proposed/requested by the STA as a temporary channel during a TWT SP.

At Step 602C, After receiving the TWT request from the STA, the AP responds with a TWT response, i.e., a TWT Setup frame with a TWT response to the STA, wherein the TWT response may initiate an individual TWT agreement with the TWT parameters indicated in the TWT response for the trigger-enabled TWT SP, e.g., a start time of a future individual TWT SP, an interval between individual TWT SPs, a duration of a TWT SP, and a subchannel provided to the STA as a temporary channel during a TWT SP. The parameters given by the SST AP may be different from or the same as the parameters suggested by the SST STA.

After the individual TWT agreement is established between the STA and the AP, the STA will operate at the provided/negotiated subchannel which may not be a primary channel during the negotiated trigger-enabled TWT SP and operate at a primary channel outside the negotiated trigger-enabled TWT SP. During the negotiated trigger-enabled TWT SP, the RUs or MRUs which are allocated in EHT MU PPDUs and in Trigger frames for soliciting EHT TB PPDUs and addressed to the SST STA are in the negotiated subchannel. As a result, RUs or MRUs in an EHT PPDU may be allocated to multiple STAs with different operating bandwidth in an efficient manner, which may improve system throughput.

Figure 6D:
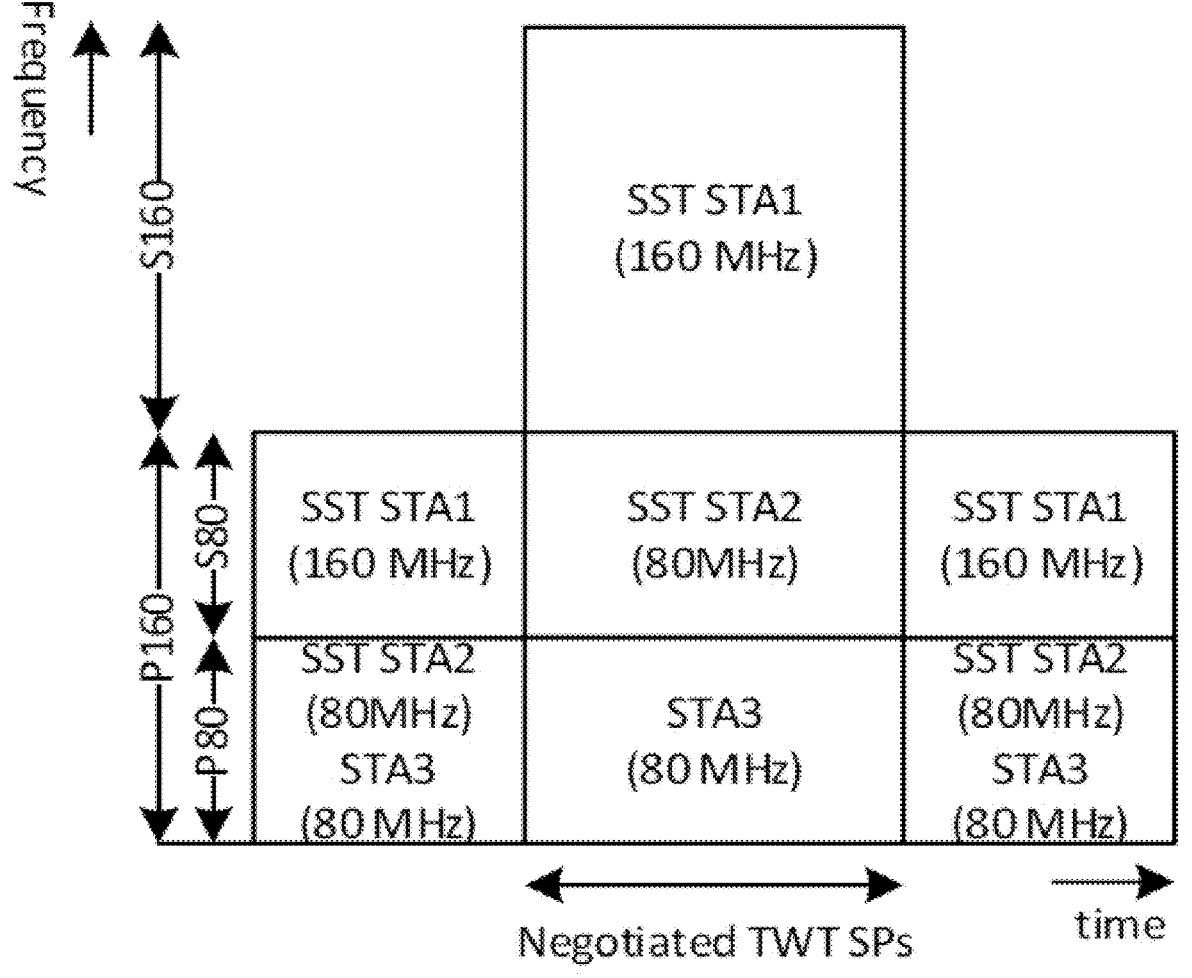
FIG. 6D is a schematic diagram illustrating an example of SST operation for STAs in a 320 MHz BSS according to some embodiments of the invention.

FIG. 6D is a schematic diagram illustrating an example of SST operation for STAs in a 320 MHz BSS according to some embodiments of the invention. In this embodiment, there are three STAs, i.e., STA1, STA2, STA3 in the 320 MHz BSS, wherein STA1 is a 160 MHz operating SST STA, STA2 is an 80 MHz operating SST STA and STA3 is an 80 MHz operating non-SST STA that always operates at a primary 80 MHz channel P80. The negotiated trigger-enabled TWT SP for STA1 is overlapping in time with that for STA2. During the negotiated trigger-enabled TWT SPs, STA1 and STA2 operate at a secondary 160 MHz channel S160 and a secondary 80 MHz channel S80, respectively. A 320 MHz EHT PPDU may be transmitted to or from STA1, STA2 and STA3, wherein the RUs or MRUs allocated to STA1, STA2 and STA3 are within the S160, S80 and P80, respectively. On the other hand, outside the negotiated trigger-enabled TWT SPs, STA1 and STA2 operate at a primary 160 MHz channel P160 and the P80, respectively. A 160 MHz EHT PPDU may be transmitted to or from STA1, STA2 and STA3, wherein the RUs or MRUs allocated to STA1, STA2 and STA3 are within the P160, P80 and P80, respectively. It is apparent that channel utilization is more efficient during the negotiated trigger-enabled TWT SPs than outside the negotiated trigger-enabled TWT SPs.

The TWT Setup frame is a kind of Unprotected S1G Action frame. FIG. 7A is a diagram illustrating a format of the TWT Setup frame Action field according to some embodiments of the invention. The TWT Setup frame includes one or two TWT elements. FIG. 7B is a block diagram illustrating a format of the TWT element according to some embodiments of the invention. Referring to FIG. 7B, the TWT element may include an Element ID field with its value set to 216, a Length field, a Control field and a TWT Parameter Information field. In various embodiments of the invention, at least one guaranteed non-punctured 20 MHz channel in a subchannel provided to or proposed by an STA as a temporary channel during a TWT SP may be indicate in the TWT Parameter Information field.

FIG. 7C is a block diagram illustrating a format of the Control field of the TWT element according to some embodiments of the invention. Referring to FIG. 7C, the Control field may include an NDP Paging Indicator field and a Negotiation Type field. The NDP Paging Indicator field is set to indicate presence of an NDP Paging field in the TWT Parameter Information field. For example, the NDP Paging Indicator field may be set to 0 to indicate that the NDP Paging field is not present in the TWT Parameter Information field; and set to 1 to indicate that the NDP Paging field is present in the TWT Parameter Information field. The Negotiation Type field is set to indicate whether the information included in the TWT element is for the negotiation of parameters of broadcast or individual TWT(s) or a wake target beacon transmission time (TBTT) interval. The Negotiation Type field may be set to 0 to indicate that the information included in the TWT element is for the negotiation of parameters of individual TWT(s) or a wake TBTT interval; and set to 1 to indicate the information included in the TWT element is for the negotiation of parameters of broadcast TWT(s). The Broadcast field and the NDP Paging Indicator field may be set to 0 in all TWT elements during the individual TWT setup.

Two embodiments of the invention will be described below to illustrate the method for SST operation in a WLAN according to various embodiments of the invention. It should be noted that these embodiments are provided for illustrative purposes only, not to limit the scope of the invention.

First Embodiment

In the first embodiment, three fields are set in the first or second TWT element to indicate the at least one guaranteed non-punctured 20 MHz channel in a subchannel provided to or proposed by an STA as a temporary channel during a TWT SP.

FIG. 8A is a block diagram illustrating a format of the TWT Parameter Information field in all TWT elements during the individual TWT setup according to some embodiments of the invention. As shown in FIG. 8A, the TWT Parameter Information field may include an Individual TWT Parameter Set field and an Extended Individual TWT Parameter Set field.

FIG. 8B is a block diagram illustrating a format of the Individual TWT Parameter Set field as shown in FIG. 8A according to some embodiments of the invention. As shown in FIG. 8B, the Individual TWT Parameter Set field include a Request Type field, a Target Wake Time field, a Nominal Minimum TWT Wake Duration field, a TWT Wake Interval Mantissa field and a TWT Channel field.

FIG. 8C is a block diagram illustrating a format of the Request Type field as shown in FIG. 8B according to some embodiments of the invention. As shown in FIG. 8B, the Request Type field may include a TWT Request field, a Trigger field, and an Implicit field. The TWT Request field may be set to indicate whether TWT request information is included in the TWT element. For example, the TWT Request field may be set to 1 to indicate that TWT request information is included in the TWT element; and set to 0 to indicate that TWT response information is included in the TWT element. The Trigger field may be set to indicate whether the TWT SP indicated by the TWT element includes triggering frames. For example, the Trigger field may be set to 1 to indicate that at least one triggering frame is transmitted during the TWT SP; and set to 0 otherwise. The Implicit field may be set to indicate whether an implicit TWT or an explicit TWT is being negotiated. For example, the Implicit field may be set to 1 to indicate an implicit TWT; and is set to 0 to indicate an explicit TWT. The Trigger field and the Implicit field may be set to 1 in all TWT elements during the individual trigger-enabled TWT setup. The TWT Flow Identifier field may be set to identify the specific information for this TWT request uniquely from other requests made between the same SST STA and SST AP pair. The Target Wake Time field may be set to indicate a future individual TWT SP start time. The TWT Wake Interval Mantissa field, together with the TWT Wake Interval Exponent field of the Request Type field, may be set to indicate an interval between individual TWT SPs. The Nominal Minimum TWT Wake Duration field, together with the Wake Duration Unit field of the Control field, may be set to indicate a minimum duration of an individual TWT SP.

FIG. 8D is a block diagram illustrating a format of the Extended Individual TWT Parameter Set field according to the first embodiment of the invention. As shown in FIG. 8D, in this embodiment, the Extended Individual TWT Parameter Set field includes a PS160 field, a Guaranteed Channel Presence field (i.e., the second field), a Dynamic Puncturing SST Disabled field (i.e., the third field) and a Guaranteed Channel field (i.e., the first field). The PS160 field is set to indicate whether the subchannel proposed by or provided to the SST STA as a temporary channel during a TWT SP is in P160 or S160. For example, the PS160 field may be set to 0 indicate that the subchannel is in P160; and set to 1 to indicate that the subchannel is in S160. The Guaranteed Channel Presence field is set to indicate whether a Guaranteed Channel field is present in the Extended Individual TWT Parameter Set field. For example, the Guaranteed Channel Presence field may be set to 1 to indicate that a Guaranteed Channel field is present in the Extended Individual TWT Parameter Set field; and set to 0 otherwise. The Dynamic Puncturing SST Disabled field is set to indicate whether SST operation with dynamic puncturing is disabled for the SST STA. For example, the Dynamic Puncturing SST Disabled field may be set to 1 to indicate that SST operation with dynamic puncturing is disabled for the SST STA; and set to 0 otherwise. The Dynamic Puncturing SST Disabled field may be set to indicate SST operation with dynamic puncturing is disabled for the SST STA if any of the requirements (a) to (d) mentioned above is satisfied.

In this embodiment, the Guaranteed Channel Presence field is set to indicate that the Guaranteed Channel field is not present in the TWT element if the Dynamic Puncturing SST Disabled field is set to indicate that the SST operation with dynamic puncturing is disabled for the SST STA. If the Dynamic Puncturing SST Disabled field is set to indicate that the SST operation with dynamic puncturing is enabled for the SST STA, the Guaranteed Channel Presence field may be set to indicate that the Guaranteed Channel field is not present in the TWT element if any of the requirements (A) and (B) mentioned above is satisfied.

When the requirement (A) is satisfied, one guaranteed non-punctured 20 MHz channel can be determined from the punctured 20 MHz channel in the subchannel, since two 20 MHz subchannels corresponding to a same EHT-SIG content channel of an EHT MU PPDU shall not be punctured. When the requirement (B) is satisfied, when the SST STA receives an EHT MU PPDU addressed to multiple STAs including itself during the TWT SP, the SST STA only needs to process the pre-EHT modulated fields of an 80 MHz frequency subblock comprising the punctured 40 MHz channel. It should be noted that two guaranteed non-punctured 20 MHz channels in the 80 MHz frequency subblock can be determined from the punctured 40 MHz channel in the subchannel, since two 20 MHz subchannels corresponding to a same EHT-SIG content channel shall not be punctured.

According to the first embodiment, if the SST STA is a 20 MHz operating STA, the TWT request may include the TWT Channel field with one bit set to 1 and the PS160 field set to 0 or 1 to indicate a 20 MHz channel proposed or requested to be the subchannel as a temporary channel during a TWT SP for the SST STA.

According to the first embodiment, if the SST STA is an 80 MHz operating STA, the TWT request may include the TWT Channel field with all the four LSBs or all the four MSBs set to 1 and the PS160 field set to 0 or 1 to indicate an 80 MHz channel is requested to be the subchannel as a temporary channel during a TWT SP for the SST STA. The TWT request may further include the Guaranteed Channel field with one or more of the four LSBs set to 1 to indicate one or more guaranteed non-punctured 20 MHz channel within the 80 MHz channel.

According to the first embodiment, if the SST STA is an 80 MHz operating STA, the TWT request may include the TWT Channel field with three of the four LSBs or three of the four MSBs set to 1 and have the PS160 field set to 0 or 1 to indicate an 80 MHz channel which includes one punctured 20 MHz channel is requested to be the subchannel as a temporary channel during a TWT SP for the SST STA.

According to the first embodiment, if the SST STA is an 80 MHz operating STA, the TWT request may include the TWT Channel field with two of the four LSBs or two of the four MSBs set to 1 and the PS160 field set to 0 or 1 to indicate an 80 MHz channel which includes one punctured 40 MHz channel is requested to be the subchannel as a temporary channel during a TWT SP for the SST STA that is an 80 MHz operating STA.

According to the first embodiment, if the SST STA is a 160 MHz operating STA, the TWT request may include the TWT Channel field with all the eight bits set to 1 and the PS160 field set to 0 or 1 to indicate whether P160 or S160 is requested to be the subchannel as a temporary channel during a TWT SP for the SST STA. The TWT request may further have the Guaranteed Channel field with one or more of the four LSBs set to 1 and/or one or more of the four MSBs set to 1 to indicate one or more guaranteed non-punctured 20 MHz channel for at least one 80 MHz in P160 or S160.

According to the first embodiment, if the SST STA is a 160 MHz operating STA, the TWT request may include the TWT Channel field with six of the eight bits set to 1 and the PS160 field set to 0 or 1 to indicate whether P160 or S160 which include one punctured 40 MHz channel is requested to be the subchannel as a temporary channel during a TWT SP for the SST STA.

According to the first embodiment, if the SST STA is a 160 MHz operating STA, the TWT request may include the TWT Channel field with four of the eight bits set to 1 and the PS160 field set to 0 or 1 to indicate whether P160 or S160 which includes one punctured 80 MHz channel is requested to be the subchannel as a temporary channel during a TWT SP for the SST STA. If the lower 80 MHz in P160 or S160 is punctured, the TWT request may further include the Guaranteed Channel field with one or more of the four MSBs set to 1 to indicate one or more guaranteed non-punctured 20 MHz channel for the higher 80 MHz in P160 or S160. If the higher 80 MHz in P160 or S160 is punctured, the TWT request may further include the Guaranteed Channel field with one or more of the four LSBs set to 1 to indicate one or more guaranteed non-punctured 20 MHz channel for the lower 80 MHz in P160 or S160.

According to the first embodiment, if the SST STA is a 160 MHz operating STA, the TWT request may include the TWT Channel field with two of the eight bits set to 1 and the PS160 field set to 0 or 1 to indicate whether P160 or S160 which includes one punctured 40 MHz channel and one punctured 80 MHz channel is requested to be the subchannel as a temporary channel during a TWT SP for the SST STA.

According to the first embodiment, if the SST STA is a 20 MHz operating STA, the TWT response may include the TWT Channel field with one bit set to 1 and the PS160 field set to 0 or 1 to indicate a 20 MHz channel provided to the SST STA as a temporary channel during a TWT SP.

According to the first embodiment, if the SST STA is an 80 MHz operating STA, the TWT response may include the TWT Channel field with all the four LSBs or all the four MSBs set to 1 and the PS160 field set to 0 or 1 to indicate an 80 MHz channel provided to the SST STA as a temporary channel during a TWT SP. The TWT response may further include the Guaranteed Channel field with one or more of the four LSBs set to 1 to indicate one or more guaranteed non-punctured 20 MHz channel within the 80 MHz channel.

According to the first embodiment, if the SST STA is an 80 MHz operating STA, the TWT response may include the TWT Channel field with three of the four LSBs or three of the four MSBs set to 1 and the PS160 field set to 0 or 1 to indicate an 80 MHz channel including one punctured 20 MHz channel provided to the SST STA as a temporary channel during a TWT SP.

According to the first embodiment, if the SST STA is an 80 MHz operating STA, the TWT response may include the TWT Channel field with two of the four LSBs or three of the four MSBs set to 1 and the PS160 field to 0 or 1 to indicate an 80 MHz channel including one punctured 40 MHz channel provided to the SST STA as a temporary channel during a TWT SP.

According to the first embodiment, if the SST STA is a 160 MHz operating STA, the TWT response may include the TWT Channel field with all the eight bits set to 1 and the PS160 field set to 0 or 1 to indicate either P160 or S160 provided to the SST STA as a temporary channel during a TWT SP. The TWT response may further include the Guaranteed Channel field with one or more of the four LSBs set to 1 and/or one or more of the four MSBs set to 1 to indicate one or more guaranteed non-punctured 20 MHz channel for at least one 80 MHz frequency subblock within P160 or S160.

According to the first embodiment, if the SST STA is a 160 MHz operating STA, the TWT response may include the TWT Channel field with six of the eight bits set to 1 and the PS160 field set to 0 or 1 to indicate whether P160 or S160 with one punctured 40 MHz channel provided to the SST STA as a temporary channel during a TWT SP.

According to the first embodiment, if the SST STA is a 160 MHz operating STA, the TWT response may include the TWT Channel field with four of the eight bits set to 1 and the PS160 field set to 0 or 1 to indicate whether P160 or S160 with one punctured 80 MHz channel provided to the SST STA as a temporary channel during a TWT SP. If the lower 80 MHz in P160 or S160 is punctured, the TWT response may further include the Guaranteed Channel field with one or more of the four MSBs set to 1 to indicate one or more guaranteed non-punctured 20 MHz channel for the higher 80 MHz in P160 or S160. If the higher 80 MHz in P160 or S160 is punctured, the TWT response may further include the Guaranteed Channel field with one or more of the four LSBs set to 1 to indicate one or more guaranteed non-punctured 20 MHz channel for the lower 80 MHz in P160 or S160.

According to the first embodiment, if the SST STA is a 160 MHz operating STA, the TWT response may include the TWT Channel field with two of the eight bits set to 1 and the PS160 field set to 0 or 1 to indicate whether P160 or S160 with one punctured 40 MHz channel and one punctured 80 MHz channel provided to the SST STA as a temporary channel during a TWT SP.

Table 1 illustrates the settings of the TWT Channel field, the PS160 field, the Dynamic Puncturing SST Disabled field, the Guaranteed Channel Presence field, and the Guaranteed Channel field for some example subchannels provided to a 160 MHz operating SST STA as a temporary channel during a TWT SP in a 320 MHz BSS, where SST operation with dynamic puncturing may be enabled for the 160 MHz operating SST STA, according to the first embodiment.

TABLE 1

| Subchannels provided to an SST STA as a temporary channel during a TWT SP | PS160 field | Dynamic Puncturing SST Disabled field | Guaranteed Channel Presence field | TWT Channel field B0 to B7 | Guaranteed Channel field B0 to B7 |
|---|---|---|---|---|---|
| P160 | 0 | 1 | 0 | 11111111 | N.A. |
| P160 with 2nd lowest 40 MHz punctured | 0 | 1 | 0 | 11001111 | N.A. |
| P160 with higher 80 MHz punctured | 0 | 1 | 0 | 11110000 | N.A. |
| P160 with 2nd lowest 40 MHz and higher 80 MHz punctured | 0 | 1 | 0 | 11000000 | N.A. |
| S160 | 1 | 0 | 1 | 11111111 | 10000100 (lowest 20 MHz and 6th lowest 20 MHz of S160 are guaranteed) |
| S160 with 2nd lowest 40 MHz punctured | 1 | 0 | 0 | 11001111 | N.A. |
| S160 with higher 80 MHz punctured | 1 | 0 | 1 | 11110000 | 01000000 (2nd lowest 20 MHz of S160 is guaranteed) |
| S160 with 2nd lowest 40 MHz and higher 80 MHz punctured | 1 | 1 | 0 | 11000000 | N.A. |

Table 2 illustrates the settings of the TWT Channel field, the PS 160 field, the Dynamic Puncturing SST Disabled field, the Guaranteed Channel Presence field, and the Guaranteed Channel field for some example subchannels provided to an 80 MHz operating SST STA as a temporary channel during a TWT SP in a 320 MHz BSS, according to the first embodiment. Assume the lower 80 MHz of P160 is P80, where SST operation with dynamic puncturing may be enabled for the 80 MHz operating SST STA.

TABLE 2

| Subchannels provided to SST STA as a temporary channel during a TWT SP | PS160 field | Dynamic Puncturing SST Disabled field | Guaranteed Channel Presence field | TWT Channel field B0 to B7 | Guaranteed Channel field B0 to B7 |
|---|---|---|---|---|---|
| P80 | 0 | 1 | 0 | 11110000 | N.A. |
| P80 with 3rd lowest 20 MHz punctured | 0 | 1 | 0 | 11010000 | N.A. |
| P80 with higher 40 MHz punctured | 0 | 1 | 0 | 11000000 | N.A. |
| S80 | 0 | 0 | 1 | 00001111 | 00001000 (lowest 20 MHz of S80 is guaranteed) |
| S80 with 3rd lowest 20 MHz punctured | 0 | 0 | 0 | 00001101 | N.A. |
| S80 with higher 40 MHz punctured | 0 | 1 | 0 | 00001100 | N.A. |
| Lower 80 MHz of S160 | 1 | 0 | 1 | 11110000 | 10000000 (lowest 20 MHz of S160 is guaranteed) |
| Lower 80 MHz of S160 with 3rd lowest 20 MHz punctured | 1 | 0 | 0 | 11010000 | N.A. |
| Lower 80 MHz of S160 with higher 40 MHz punctured | 1 | 1 | 0 | 11000000 | N.A. |
| Higher 80 MHz of S160 | 1 | 0 | 1 | 00001111 | 10000000 (lowest 20 MHz of S160 is guaranteed) |

TABLE 2-continued

| Subchannels provided to SST STA as a temporary channel during a TWT SP | PS160 field | Dynamic Puncturing SST Disabled field | Guaranteed Channel Presence field | TWT Channel field B0 to B7 | Guaranteed Channel field B0 to B7 |
|---|---|---|---|---|---|
| Higher 80 MHz of S160 with 3$^{rd}$ lowest 20 MHz punctured | 1 | 0 | 0 | 00001101 | N.A. |
| Higher 80 MHz of S160 with higher 40 MHz punctured | 1 | 1 | 0 | 00001100 | N.A. |

Table 3 illustrates the settings of the TWT Channel field, the PS160 field, the Dynamic Puncturing SST Disabled field, the Guaranteed Channel Presence field, and the Guaranteed Channel field for some example subchannels provided to an 80 MHz operating SST STA as a temporary channel during a TWT SP in a 160 MHz BSS, according to the first embodiment. Assume the lower 80 MHz is P80, where SST operation with dynamic puncturing may be enabled for the 80 MHz operating SST STA.

TABLE 3

| Subchannels provided to an SST STA as a temporary channel during a TWT SP | PS160 field | Dynamic Puncturing SST Disabled field | Guaranteed Channel Presence field | TWT Channel field B0 to B7 | Guaranteed Channel field B0 to B7 |
|---|---|---|---|---|---|
| P80 | 0 | 1 | 0 | 11110000 | N.A. |
| P80 with 3$^{rd}$ lowest 20 MHz punctured | 0 | 1 | 0 | 11010000 | N.A. |
| P80 with higher 40 MHz punctured | 0 | 1 | 0 | 11000000 | N.A. |
| S80 | 0 | 0 | 1 | 00001111 | 00000010 (3$^{rd}$ lowest 20 MHz of S80 is guaranteed) |
| S80 with 3$^{rd}$ lowest 20 MHz punctured | 0 | 0 | 0 | 00001101 | N.A. |
| S80 with higher 40 MHz punctured | 0 | 1 | 0 | 00001100 | N.A. |

Second Embodiment

In the second embodiment, only two fields set in the Extended Individual TWT Parameter Set field are used to indicate the at least one guaranteed non-punctured 20 MHz channel in a subchannel provided to or proposed by the STA as a temporary channel during a TWT SP.

FIG. 8E is a block diagram illustrating a format of the Extended Individual TWT Parameter Set field according to the second embodiment. As shown in FIG. 8E, the Extended Individual TWT Parameter Set field includes a PS160 field, a Guaranteed Channel Presence field and a Guaranteed Channel field. The PS160 field is set to indicate whether the subchannel proposed by or provided to the SST STA as a temporary channel during a TWT SP is in P160 or S160. For example, the PS160 field may be set to 0 indicate that the subchannel is in P160; and set to 1 to indicate that the subchannel is in S160. The Guaranteed Channel Presence field is set to indicate whether a Guaranteed Channel field is present in the Extended Individual TWT Parameter Set field, which is equivalent to whether SST operation with dynamic puncturing is enabled for the SST STA. For example, the Guaranteed Channel Presence field may be set to 1 to indicate that a Guaranteed Channel field is present in the Extended Individual TWT Parameter Set field, i.e., SST operation with dynamic puncturing is enabled for the SST STA; and set to 0 otherwise.

According to the second embodiment, the Guaranteed Channel Presence field may be set to indicate that the Guaranteed Channel field is not present in the Extended Individual TWT Parameter Set field, i.e., SST operation with dynamic puncturing is disabled for the SST STA, if any of the requirements (a) to (d) mentioned above is satisfied.

According to the second embodiment, if the SST STA that is a 20 MHz operating STA, the TWT request may include the TWT Channel field with one bit set to 1 and the PS160 field set to 0 or 1 to indicate a 20 MHz channel requested to be the subchannel as a temporary channel during a TWT SP for the SST STA.

According to the second embodiment, if the SST STA that is an 80 MHz operating STA, the TWT request may include the TWT Channel field with all the four LSBs or all the four MSBs set to 1 and the PS160 field set to 0 or 1 to indicate an 80 MHz channel is requested to be the subchannel as a temporary channel during a TWT SP for the SST STA. The TWT request may further include the Guaranteed Channel field with one or more of the four LSBs or one or more of the four MSBs set to 1 to indicate one or more guaranteed non-punctured 20 MHz channel within the 80 MHz channel.

According to the second embodiment, if the SST STA that is an 80 MHz operating STA, the TWT request may include the TWT Channel field with three of the four LSBs or three of the four MSBs set to 1 and the PS160 field set to 0 or 1 to indicate an 80 MHz channel which includes one punctured 20 MHz channel is requested to be the subchannel as a temporary channel during a TWT SP for the SST STA. The TWT request may further include the Guaranteed Channel field with one or more of the four LSBs or one or more of the four MSBs set to 1 to indicate one or more guaranteed non-punctured 20 MHz channel within the 80 MHz channel.

According to the second embodiment, if the SST STA that is an 80 MHz operating STA, the TWT request may include the TWT Channel field with two of the four LSBs or two of the four MSBs set to 1 and the PS160 field set to 0 or 1 to indicate an 80 MHz channel which includes one punctured 40 MHz channel is requested to be the subchannel as a temporary channel during a TWT SP for the SST STA.

According to the second embodiment, if the SST STA that is a 160 MHz operating STA, the TWT request may include the TWT Channel field with all the eight bits set to 1 and the PS160 field set to 0 or 1 to indicate whether P160 or S160 is requested to be the subchannel as a temporary channel during a TWT SP for the SST STA. The TWT request may further include the Guaranteed Channel field with one or more of the four LSBs set to 1 and/or one or more of the four MSBs set to 1 to indicate one or more guaranteed non-punctured 20 MHz channel for at least one 80 MHz in P160 or S160.

According to the second embodiment, if the SST STA that is a 160 MHz operating STA, the TWT request may include the TWT Channel field with six of the eight bits set to 1 and have the PS160 field set to 0 or 1 to indicate whether P160 or S160 which includes one punctured 40 MHz channel is requested to be the subchannel as a temporary channel during a TWT SP for the SST STA. If the lower 80 MHz in P160 or S160 includes the punctured 40 MHz channel, the TWT request may further include the Guaranteed Channel field with two of the four LSBs set to 1 and/or one or more of the four MSBs set to 1 to indicate two non-punctured 20 MHz channels for the lower 80 MHz and/or one or more guaranteed non-punctured 20 MHz channel for the higher 80 MHz in P160 or S160. If the higher 80 MHz in P160 or S160 includes the punctured 40 MHz channel, the TWT request may further include the Guaranteed Channel field with two of the four MSBs set to 1 and/or one or more of the four LSBs set to 1 to indicate two non-punctured 20 MHz channels for the higher 80 MHz and/or one or more guaranteed non-punctured 20 MHz channel for the lower 80 MHz in P160 or S160.

According to the second embodiment, if the SST STA that is a 160 MHz operating STA, the TWT request may include the TWT Channel field with four of the eight bits set to 1 and the PS160 field set to 0 or 1 to indicate whether P160 or S160 which includes one punctured 80 MHz channel is requested to be the subchannel as a temporary channel during a TWT SP for the SST STA. If the lower 80 MHz in P160 or S160 is punctured, the TWT request may further include the Guaranteed Channel field with one or more of the four MSBs set to 1 to indicate one or more guaranteed non-punctured 20 MHz channel for the higher 80 MHz in P160 or S160. If the higher 80 MHz in P160 or S160 is punctured, the TWT request may further include the Guaranteed Channel field with one or more of the four LSBs set to 1 to indicate one or more guaranteed non-punctured 20 MHz channel for the lower 80 MHz in P160 or S160.

According to the second embodiment, if the SST STA that is a 160 MHz operating STA, the TWT request may include the TWT Channel field with two of the eight bits set to 1 and the PS160 field set to 0 or 1 to indicate whether P160 or S160 which includes one punctured 40 MHz channel and one punctured 80 MHz channel is requested to be the subchannel as a temporary channel during a TWT SP for the SST STA.

According to the second embodiment, if the SST STA is a 20 MHz operating STA, the TWT response may include the TWT Channel field with one bit set to 1 and the PS160 field set to 0 or 1 to indicate a 20 MHz channel provided to the SST STA as a temporary channel during a TWT SP.

According to the second embodiment, if the SST STA is an 80 MHz operating STA, the TWT response may include the TWT Channel field with all the four LSBs or all the four MSBs set to 1 and the PS160 field set to 0 or 1 to indicate an 80 MHz channel provided to the SST STA as a temporary channel during a TWT SP. The TWT response may further include the Guaranteed Channel field with one or more of the four LSBs set to 1 to indicate one or more guaranteed non-punctured 20 MHz channel within the 80 MHz channel.

According to the second embodiment, if the SST STA is an 80 MHz operating STA, the TWT response may include the TWT Channel field with three of the four LSBs or three of the four MSBs set to 1 and the PS160 field set to 0 or 1 to indicate an 80 MHz channel including one punctured 20 MHz channel provided to the SST STA as a temporary channel during a TWT SP. The TWT response may further include the Guaranteed Channel field with one or more of the four LSBs set to 1 to indicate one or more guaranteed non-punctured 20 MHz channel within the 80 MHz channel.

According to the second embodiment, if the SST STA is an 80 MHz operating STA, the TWT response may include the TWT Channel field with two of the four LSBs or three of the four MSBs set to 1 and the PS160 field to 0 or 1 to indicate an 80 MHz channel including one punctured 40 MHz channel provided to the SST STA as a temporary channel during a TWT SP.

According to the second embodiment, if the SST STA is a 160 MHz operating STA, the TWT response may include the TWT Channel field with all the eight bits set to 1 and the PS160 field set to 0 or 1 to indicate either P160 or S160 provided to the SST STA as a temporary channel during a TWT SP. The TWT response may further include the Guaranteed Channel field with one or more of the four LSBs set to 1 and/or one or more of the four MSBs set to 1 to indicate one or more guaranteed non-punctured 20 MHz channel for at least one 80 MHz frequency subblock within P160 or S160.

According to the second embodiment, if the SST STA is a 160 MHz operating STA, the TWT response may include the TWT Channel field with six of the eight bits set to 1 and the PS160 field set to 0 or 1 to indicate whether P160 or S160 with one punctured 40 MHz channel provided to the SST STA as a temporary channel during a TWT SP. If the lower 80 MHz in P160 or S160 includes the punctured 40 MHz channel, the TWT response may further include the Guaranteed Channel field with two of the four LSBs set to 1 and/or one or more of the four MSBs set to 1 to indicate two non-punctured 20 MHz channels for the lower 80 MHz and/or one or more guaranteed non-punctured 20 MHz channel for the higher 80 MHz in P160 or S160. If the higher 80 MHz in P160 or S160 includes the punctured 40 MHz channel, the TWT response may further include the Guaranteed Channel field with two of the four MSBs set to 1 and/or one or more of the four LSBs set to 1 to indicate two non-punctured 20 MHz channels for the higher 80 MHz and/or one or more guaranteed non-punctured 20 MHz channel for the lower 80 MHz in P160 or S160.

According to the second embodiment, if the SST STA is a 160 MHz operating STA, the TWT response may include the TWT Channel field with four of the eight bits set to 1 and the PS160 field set to 0 or 1 to indicate whether P160 or S160 with one punctured 80 MHz channel provided to the SST STA as a temporary channel during a TWT SP. If the lower 80 MHz in P160 or S160 is punctured, the TWT response may further include the Guaranteed Channel field According to the second embodiment, if the SST STA is a 160 MHz operating STA, the TWT response may include the TWT Channel field with two of the eight bits set to 1 and the PS160 field set to 0 or 1 to indicate whether P160 or S160 with one punctured 40 MHz channel and one punctured 80 MHz channel provided to the SST STA as a temporary channel during a TWT SP.

Table 4 illustrates the settings of the TWT Channel field, the PS160 field, the Guaranteed Channel Presence field, and the Guaranteed Channel field for some example subchannels provided to a 160 MHz operating SST STA as a temporary channel during a TWT SP in a 320 MHz BSS, according to the second embodiment, where SST operation with dynamic puncturing may be enabled for the 160 MHz operating SST STA.

TABLE 4

| Subchannels provided to an SST STA as a temporary channel during a TWT SP | PS160 field | Guaranteed Channel Presence field | TWT Channel field B0 to B7 | Guaranteed Channel field B0 to B7 |
|---|---|---|---|---|
| P160 | 0 | 0 | 11111111 | N.A. |
| P160 with 2nd lowest 40 MHz punctured | 0 | 0 | 11001111 | N.A. |
| P160 with higher 80 MHz punctured | 0 | 0 | 11110000 | N.A. |
| P160 with 2nd lowest 40 MHz and higher 80 MHz punctured | 0 | 0 | 11000000 | N.A. |
| S160 | 1 | 1 | 11111111 | 10000100 (lowest 20 MHz and 6th lowest 20 MHz of S160 are guaranteed) |
| S160 with 2nd lowest 40 MHz punctured | 1 | 1 | 11001111 | 11001000 (lower 40 MHz and 5th lowest 20 MHz of S160 is guaranteed) |
| S160 with higher 80 MHz punctured | 1 | 1 | 11110000 | 01000000 (2nd lowest 20 MHz of S160 is guaranteed) |
| S160 with 2nd lowest 40 MHz and higher 80 MHz punctured | 1 | 0 | 11000000 | N.A. | with one or more of the four MSBs set to 1 to indicate one or more guaranteed non-punctured 20 MHz channel for the higher 80 MHz in P160 or S160. If the higher 80 MHz in P160 or S160 is punctured, the TWT response may further include the Guaranteed Channel field with one or more of the four LSBs set to 1 to indicate one or more guaranteed non-punctured 20 MHz channel for the lower 80 MHz in P160 or S160.

Table 5 illustrates the settings of the TWT Channel field, the PS160 field, the Guaranteed Channel Presence field, and the Guaranteed Channel field for some example subchannels provided to an 80 MHz operating SST STA as a temporary channel during a TWT SP in a 320 MHz BSS, according to the second embodiment. Assume the lower 80 MHz of P160 is P80, where SST operation with dynamic puncturing may be enabled for the 80 MHz operating SST STA.

TABLE 5

| Subchannels provided to SST STA as a temporary channel during a TWT SP | PS160 field | Guaranteed Channel Presence field | TWT Channel field B0 to B7 | Guaranteed Channel field B0 to B7 |
|---|---|---|---|---|
| P80 | 0 | 0 | 11110000 | N.A. |
| P80 with 3rd lowest 20 MHz punctured | 0 | 0 | 11010000 | N.A. |
| P80 with higher 40 MHz punctured | 0 | 0 | 11000000 | N.A. |

TABLE 5-continued

| Subchannels provided to SST STA as a temporary channel during a TWT SP | PS160 field | Guaranteed Channel Presence field | TWT Channel field B0 to B7 | Guaranteed Channel field B0 to B7 |
|---|---|---|---|---|
| S80 | 0 | 1 | 00001111 | 00001000 (lowest 20 MHz within S80 is guaranteed) |
| S80 with 3rd lowest 20 MHz punctured | 0 | 1 | 00001101 | 00001000 (lowest 20 MHz within S80 is guaranteed) |
| S80 with higher 40 MHz punctured | 0 | 0 | 00001100 | N.A. |
| Lower 80 MHz of S160 | 1 | 1 | 11110000 | 10000000 (lowest 20 MHz of S160 is guaranteed) |
| Lower 80 MHz of S160 with 3rd lowest 20 MHz punctured | 1 | 1 | 11010000 | 10000000 (lowest 20 MHz of S160 is guaranteed) |
| Lower 80 MHz of S160 with higher 40 MHz punctured | 1 | 0 | 11000000 | N.A. |
| Higher 80 MHz of S160 | 1 | 1 | 00001111 | 00001000 (5th lowest 20 MHz of S160 is guaranteed) |
| Higher 80 MHz of S160 with 3rd lowest 20 MHz punctured | 1 | 1 | 00001101 | 00001000 (5th lowest 20 MHz of S160 is guaranteed) |
| Higher 80 MHz of S160 with higher 40 MHz punctured | 1 | 0 | 00001100 | N.A. |

Table 6 illustrates the settings of the TWT Channel field, the PS160 field, the Guaranteed Channel Presence field, and the Guaranteed Channel field for some example subchannels provided to an 80 MHz operating SST STA as a temporary channel during a TWT SP in a 160 MHz BSS, according to the second embodiment. Assume the lower 80 MHz is P80, where SST operation with dynamic puncturing may be enabled for the 80 MHz operating SST STA.

TABLE 6

| Subchannels provided to an SST STA as a temporary channel during a TWT SP | PS160 field | Guaranteed Channel Presence field | TWT Channel field B0 to B7 | Guaranteed Channel field B0 to B7 |
|---|---|---|---|---|
| P80 | 0 | 0 | 11110000 | N.A. |
| P80 with 3rd lowest 20 MHz punctured | 0 | 0 | 11010000 | N.A. |
| P80 with higher 40 MHz punctured | 0 | 0 | 11000000 | N.A. |
| S80 | 0 | 1 | 00001111 | 00001000 (lowest 20 MHz of S80 is guaranteed) |
| S80 with 3rd lowest 20 MHz punctured | 0 | 1 | 00001101 | 00001000 (lowest 20 MHz of S80 is guaranteed) |
| S80 with higher 40 MHz punctured | 0 | 0 | 00001100 | N.A. |

Undated TWT SST Information

Figures 9B, 10:
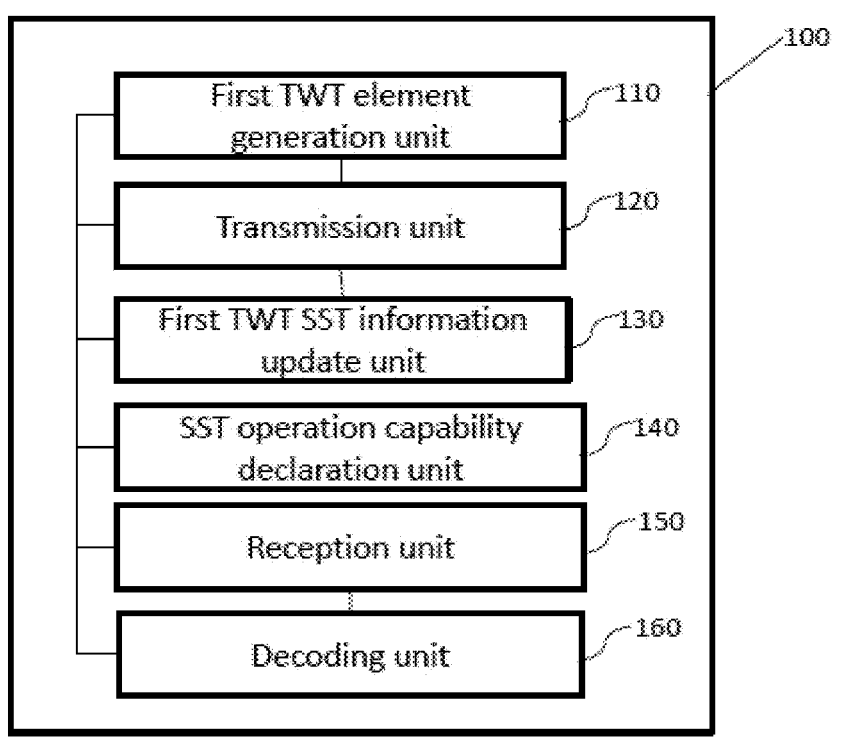
FIG. 9B is a block diagram illustrating a format of the TWT SST Information field as shown in FIG. 9A.
FIG. 10 is a schematic diagram illustrating an AP according to some embodiments of the invention.

Due to dynamics of overlapping BSS (OBSS) interference during TWT SPs, one or more than one guaranteed non-punctured channel may vary among TWT SPs. According to some embodiments of the invention, a TWT SST Information frame, i.e., the first/second frame, may be sent by an SST STA or SST AP to request or deliver SST operation information about an existing TWT agreement, e.g., one or more than one updated guaranteed non-punctured 20 MHz channel for the SST STA. The TWT SST Information frame is a kind of Unprotected S1G Action frame. FIG. 9A is a diagram illustrating a format of the TWT SST Information frame Action field according to some embodiments of the invention. As shown in FIG. 9A, the TWT SST Information frame includes a TWT SST Information field. FIG. 9B is a block diagram illustrating a format of the TWT SST Information field as shown in FIG. 9A. As shown in FIG. 9A, the TWT SST Information field includes a TWT Flow Identifier field, a Response Request field, an Updated Guaranteed Channel Request field, a Number of TWT SPs field and an Updated Guaranteed Channel field. The TWT Flow Identifier field is set to include the TWT flow identifier for which TWT information is requested or being provided. The Response Requested field is set to indicate whether the transmitter of the frame containing the TWT SST Information field is requesting a TWT SST Information frame to be transmitted in response to this frame. The Response Requested field may be set to 0 to request the recipient to not transmit a TWT SST Information frame in response to the frame; and set to 1 otherwise. The Updated Guaranteed Channel Request field may be set to 1 to indicate that the TWT SST Information frame is a request for the delivery of a TWT SST Information frame containing a nonzero length Updated Guaranteed Channel field; and set to 0 otherwise. The Updated Guaranteed Channel Presence field is set to indicate whether the Updated Guaranteed Channel field is present in this frame. The Updated Guaranteed Channel Presence field may be set to 0 to indicate the Updated Guaranteed Channel field is not present in this frame; and set to 1 otherwise. The Updated Guaranteed Channel field is set to indicate at least one updated guaranteed non-punctured 20 MHz channel for the SST STA, which will take effect at the m-th subsequent TWT SP from the current TWT SP where m may be the value indicated in the Number of TWT SPs field plus one. For example, when m=0, the updated guaranteed non-punctured 20 MHz channel will take effect at the subsequent SP immediately after the current TWT SP. When m=1, the updated guaranteed non-punctured 20 MHz channel will take effect at the second subsequent TWT SP. The Updated Guaranteed Channel field can be defined in the same manner as the Guaranteed Channel field in the TWT element.

According to some embodiments, an SST STA may receive a TWT SST Information frame including an Updated Guaranteed Channel field from a peer SST AP or receive an acknowledgement in response to a TWT SST Information frame transmitted by the SST STA, the SST STA will update one or more than one guaranteed non-punctured 20 MHz channel indicated in the Updated Guaranteed Channel field at a subsequent TWT SP according to the value of the Number of SPs field.

According to some embodiments, the Extended Individual TWT Parameter Set field of the TWT element may include a TWT SST Information Frame Disabled field (i.e., the fourth field) as illustrated in FIG. 8D and FIG. 8E. The TWT SST Information Frame Disabled field is set to indicate whether the transmitter of the TWT element supports the reception of TWT SST Information frames. For example, this field may be set to 1 to indicate the reception of TWT SST Information frames is disabled by the transmitter of the TWT element; and set to 0 otherwise. A TWT SST Information frame shall not be transmitted to an SST STA or SST AP if the reception of TWT SST Information frames is disabled for the SST STA or SST AP.

Various embodiments of the invention also provide an AP for SST operation in a WLAN. FIG. 10 is a schematic diagram illustrating an AP 100 according to some embodiments of the invention. Referring to FIG. 10, the AP 100 may include a first TWT element generation unit 110 configured to set a first TWT element of a TWT response to indicate at least one guaranteed non-punctured 20 MHz channel in a subchannel provided to an STA as a temporary channel during a TWT SP, and a transmission unit 120 configured to send the TWT response to the STA to establish an individual TWT agreement between the AP 100 and the STA.

In some embodiments, the first TWT element generation unit 110 may be further configured to set a first field in a TWT Parameter Information field of the first TWT element to indicate the at least one guaranteed non-punctured 20 MHz channel in the subchannel provided to the STA.

In some embodiments, the first TWT element generation unit 110 may be further configured to set the first field to indicate the at least one guaranteed non-punctured 20 MHz channel in at least one 80 MHz frequency subblock in the subchannel provided to the STA.

In some embodiments, the first TWT element generation unit 110 may be further configured to set a second field in the TWT Parameter Information field of the first TWT element to indicate whether the first field is set in the first TWT element.

In some embodiments, the first TWT element generation unit 110 may be further configured to set the second field in the TWT Parameter Information field of the first TWT element to indicate that the first field is not set in the first TWT element if an SST operation with dynamic puncturing is disabled for the STA.

In some embodiments, the first TWT element generation unit 110 may be further configured to set the second field to indicate that the first field is not set in the first TWT element if an SST operation with dynamic puncturing is enabled for the STA and any of the following requirements is satisfied: if the STA is an 80 MHz operating STA, the subchannel provided to the STA as the temporary channel during the TWT SP comprises one punctured 20 MHz channel which is not a non-punctured channel in an operating channel of a 160 MHz BSS or a 320 MHz BSS with which the STA is associated, and if the STA is a 160 MHz operating STA, the subchannel provided to the STA as the temporary channel during the TWT SP comprises one punctured 40 MHz channel which is not a non-punctured channel in an operating channel of a 320 MHz BSS with which the STA is associated.

In some embodiments, the first TWT element generation unit 110 may be further configured to set a third field, e.g., the dynamic puncturing SST disabled field, in the TWT Parameter Information field of the first TWT element to indicate whether the SST operation with dynamic puncturing is disabled for the STA.

In some embodiments, the first TWT element generation unit 110 may be further configured to determine that the SST operation with dynamic puncturing is disabled for the STA if any of the following requirements is satisfied: neither of the AP 100 nor the STA supports the SST operation with dynamic puncturing, the subchannel provided to the STA as the temporary channel during the TWT SP is a primary channel, if the STA is an 80 MHz operating STA, the subchannel provided to the STA as the temporary channel during the TWT SP is a non-primary channel and comprises one punctured 40 MHz channel which is not a non-punctured channel in an operating channel of a 160 MHz BSS or a 320 MHz BSS with which the STA is associated, and if the STA is a 160 MHz operating STA, the subchannel provided to the STA as the temporary channel during the TWT SP is a non-primary channel and comprises one punctured 40 MHz channel and one punctured 80 MHz channel which are not non-punctured channels in a 320 MHz BSS with which the STA is associated.

In some embodiments, the AP 100 may further include a first TWT SST information update unit 130 configured to generate a first frame, e.g., the TWT SST Information frame from the AP 100, to indicate updated SST operation information for the individual TWT agreement between the AP 100 and the STA, wherein the updated SST operation information comprises at least one updated guaranteed non-punctured 20 MHz channel which will be used in a predetermined subsequent TWT SP.

In some embodiments, the first TWT SST information update unit 130 may be further configured to receive a second frame, e.g., the TWT SST Information frame from the STA, from the STA which indicates proposed updated SST operation information for the individual TWT agreement between the AP 100 and the STA, wherein the proposed updated SST operation information comprises at least one updated guaranteed non-punctured 20 MHz channel which is proposed to be used in a predetermined subsequent TWT SP.

In some embodiments, the first TWT element generation unit 110 may be further configured to set a fourth field, e.g., the TWT SST Information Frame Disabled field, in the TWT Parameter Information field of the first TWT element to indicate whether the AP 100 supports reception of the second Frame from the STA.

In some embodiments, the AP 100 may further include an SST operation capability declaration unit 140 configured to set a first capabilities field in an HE Capabilities element to indicate whether an SST operation without puncturing is supported by the AP 100; a second capabilities field in an EHT Capabilities element to indicate whether an SST operation with static puncturing is supported by the AP 100, and a third capabilities field in the EHT Capabilities element to indicate whether an SST operation with dynamic puncturing is supported by the AP 100.

In some embodiments, the HE Capabilities element and the EHT Capabilities element may be included in a Beacon frame, a Probe Response frame, an Association Response frame or a Reassociation Response frame transmitted by the AP 100.

In some embodiments, the SST operation capability declaration unit 140 may be further configured to set the first capabilities field and the second capabilities field to indicate that the SST operation without puncturing and the SST operation with static puncturing are supported by the AP 100 respectively if the third capabilities field is set to indicate that the SST operation with dynamic puncturing is supported by the AP 100, or set the first capabilities field to indicate that the SST operation without puncturing is supported by the AP 100 if the second capabilities field is set to indicate that the SST operation with static puncturing is supported by the AP 100.

In some embodiments, the AP 100 may further include a reception unit 150 configured to before setting the first TWT element of the TWT response, receive a TWT request from the STA to request for establishing the individual TWT agreement between the AP 100 and the STA, wherein the TWT request comprises a second TWT element which is set to indicate at least one guaranteed non-punctured 20 MHz channel in a subchannel proposed by the STA as the temporary channel during the TWT SP, and a decoding unit 160 configured to decode the received TWT request to determine the at least one guaranteed non-punctured 20 MHz channel in the subchannel proposed by the STA and determine the at least one guaranteed non-punctured 20 MHz channel in the subchannel provided to the STA based on the received TWT request.

In some embodiments, the decoding unit 160 may be further configured to decode a first field, e.g., a Guaranteed Channel field, in a TWT Parameter Information field of the second TWT element to determine the at least one guaranteed non-punctured 20 MHz channel in the subchannel proposed by the STA.

In some embodiments, the decoding unit 160 may be further configured to decode the first field to determine the at least one guaranteed non-punctured 20 MHz channel in at least one 80 MHz frequency subblock in the subchannel proposed by the STA.

In some embodiments, the decoding unit 160 may be further configured to before decoding the first field, decode a second field, e.g., a Guaranteed Channel Present field, in the TWT Parameter Information field of the second TWT element to determine whether the first field is set in the second TWT element.

In some embodiments, the decoding unit 160 may be further configured to before decoding the second field, decode a third field in the TWT Parameter Information field of the second TWT element to determine whether an SST operation with dynamic puncturing is disabled for the STA, and decode the second field if the third field is set to indicate that the SST operation with dynamic puncturing is enabled for the STA.

Figure 11:
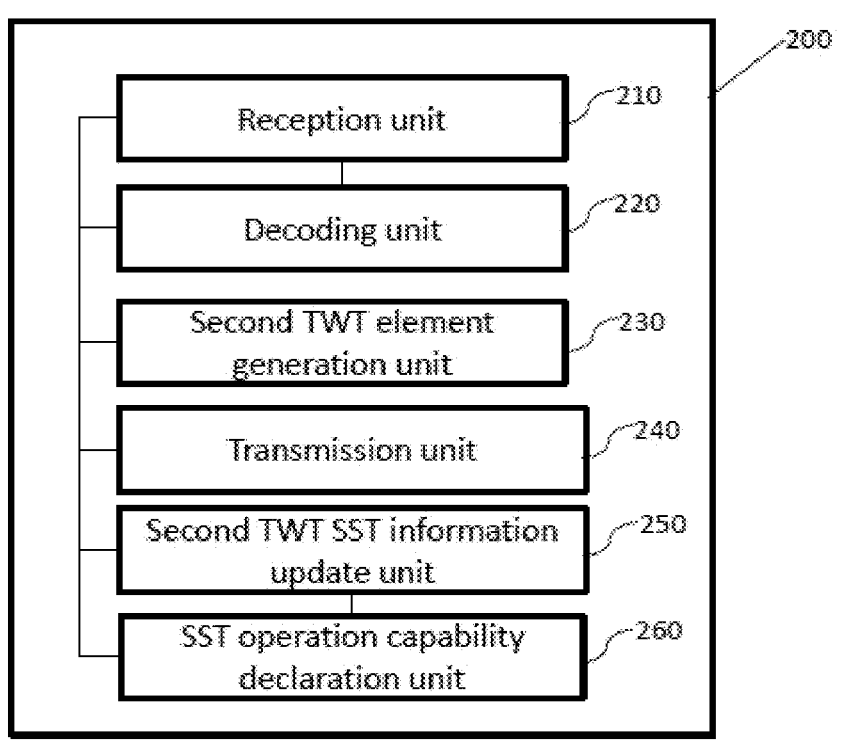
FIG. 11 is a schematic diagram illustrating an STA according to some embodiments of the invention.

Various embodiments of the invention also provide an STA for SST operation in a WLAN. FIG. 11 is a schematic diagram illustrating an STA 200 according to some embodiments of the invention. Referring to FIG. 11, the STA 200 may include a reception unit 210 configured to receive a TWT response from an AP to establish an individual TWT agreement between the AP and the STA 200, wherein the TWT response comprises a first TWT element which is set to indicate at least one guaranteed non-punctured 20 MHz channel in a subchannel provided to the STA 200 as a temporary channel during a TWT SP, and a decoding unit 220 configured to decode the received TWT response to determine the at least one guaranteed non-punctured 20 MHz channel in the subchannel provided to the STA 200.

In some embodiments, the decoding unit 220 may be further configured to decode a first field in a TWT Parameter Information field of the second TWT element to determine the at least one guaranteed non-punctured 20 MHz channel in the subchannel provided to the STA 200.

In some embodiments, the decoding unit 220 may be further configured to decode the first field to determine the at least one guaranteed non-punctured 20 MHz channel in at least one 80 MHz frequency subblock in the subchannel provided to the STA 200.

In some embodiments, the decoding unit 220 may be further configured to before decoding the first field, decode a second field in the TWT Parameter Information field of the first TWT element to determine whether the first field is set in the first TWT element.

In some embodiments, the decoding unit 220 may be further configured to before decoding the second field, decode a third field in the TWT Parameter Information field of the first TWT element to determine whether an SST operation with dynamic puncturing is disabled for the STA 200, and decode the second field if the third field is set to indicate that the SST operation with dynamic puncturing is enabled for the STA 200.

In some embodiments, the STA 200 may further include a second TWT element generation unit 230 configured to set a second TWT element of a TWT request to indicate at least one guaranteed non-punctured 20 MHz channel in a subchannel proposed by the STA 200 as the temporary channel during the TWT SP, and a transmission unit 240 configured to send the TWT request to the AP to request for establishing the individual TWT agreement between the AP and the STA 200.

In some embodiments, the second TWT element generation unit 230 may be further configured to set a first field in a TWT Parameter Information field of the second TWT element to indicate the at least one guaranteed non-punctured 20 MHz channel in the subchannel proposed by the STA 200.

In some embodiments, the second TWT element generation unit 230 may be further configured to set the first field to indicate the at least one guaranteed non-punctured 20 MHz channel in at least one 80 MHz frequency subblock in the subchannel proposed by the STA 200.

In some embodiments, the second TWT element generation unit 230 may be further configured to set a second field in the TWT Parameter Information field of the second TWT element to indicate whether the first field is set in the second TWT element.

In some embodiments, the second TWT element generation unit 230 may be further configured to set the second field in the TWT Parameter Information field of the second TWT element to indicate that the first field is not set in the second TWT element if an SST operation with dynamic puncturing is disabled for the STA 200.

In some embodiments, the second TWT element generation unit 230 may be further configured to set the second field in the TWT Parameter Information field of the second TWT element to indicate that the first field is not set in the second TWT element if an SST operation with dynamic puncturing is enabled for the STA 200 and any of the following requirements is satisfied: if the STA 200 is an 80 MHz operating STA, the subchannel proposed by the STA 200 as the temporary channel during the TWT SP comprises one punctured 20 MHz channel which is not a non-punctured channel in an operating channel of a 160 MHz BSS or a 320 MHz BSS with which the STA 200 is associated, and if the STA 200 is a 160 MHz operating STA, the subchannel proposed by the STA 200 as the temporary channel during the TWT SP comprises one punctured 40 MHz channel which is not a non-punctured channel in an operating channel of a 320 MHz BSS with which the STA 200 is associated.

In some embodiments, the second TWT element generation unit 230 may be further configured to set a third field in the TWT Parameter Information field of the second TWT element to indicate whether the SST operation with dynamic puncturing is disabled for the STA 200.

In some embodiments, the second TWT element generation unit 230 may be further configured to determine the SST operation with dynamic puncturing is disabled for the STA 200 if any of the following requirements is satisfied: neither of the AP nor the STA 200 supports the SST operation with dynamic puncturing, the subchannel proposed by the STA as the temporary channel during the TWT SP is a primary channel, if the STA 200 is an 80 MHz operating STA, the subchannel provided to the STA 200 as the temporary channel during the TWT SP is a non-primary channel and comprises one punctured 40 MHz channel which is not a non-punctured channel in an operating channel of a 160 MHz BSS or a 320 MHz BSS with which the STA 200 is associated, and if the STA 200 is a 160 MHz operating STA, the subchannel provided to the STA 200 as the temporary channel during the TWT SP is a non-primary channel and comprises one punctured 40 MHz channel and one punctured 80 MHz channel which are not non-punctured channels in a 320 MHz BSS with which the STA 200 is associated.

In some embodiments, the reception unit 210 may be further configured to receive a first frame from the AP which indicates proposed updated SST operation information for the individual TWT agreement between the AP and the STA

200, wherein the proposed updated SST operation information comprises at least one updated guaranteed non-punctured 20 MHz channel which will be used in a predetermined subsequent TWT SP, and the decoding unit is further configured to decode the received first frame to determine the proposed updated SST operation information.

In some embodiments, the second TWT element generation unit 230 may be further configured to set a fourth field in the TWT Parameter Information field of the second TWT element to indicate whether the STA 200 supports reception of the first frame from the AP.

In some embodiments, the STA 200 may further include a second TWT SST information update unit 250 configured to set a second frame to indicate proposed updated SST operation information for the individual TWT agreement between the AP and the STA 200, wherein the proposed updated SST operation information comprises at least one updated guaranteed non-punctured 20 MHz channel which is proposed to be used in a predetermined subsequent TWT SP, and the transmission unit 240 is further configured to send the second frame to the AP.

In some embodiments, the STA 200 may further include an SST operation capability declaration unit 260 configured to set a first capabilities field in an HE Capabilities element to indicate whether an SST operation without puncturing is supported by the STA 200; a second capabilities field in an EHT Capabilities element to indicate whether an SST operation with static puncturing is supported by the STA 200, and a third capabilities field in the EHT Capabilities element to indicate whether an SST operation with dynamic puncturing is supported by the STA 200.

In some embodiments, the HE Capabilities element and the EHT Capabilities element may be included in a Probe Request frame, an Association Request frame or a Reassociation Request frame transmitted by the STA 200.

In some embodiments, the SST operation capability declaration unit 260 may be further configured to set the first capabilities field and the second capabilities field to indicate that the SST operation without puncturing and the SST operation with static puncturing are supported by the STA 200 respectively if the third capabilities field is set to indicate that the SST operation with dynamic puncturing is supported by the STA 200; or set the first capabilities field to indicate that the SST operation without puncturing is supported by the STA 200 if the second capabilities field is set to indicate that the SST operation with static puncturing is supported by the STA 200.

Various embodiments of the invention also provide an AP for SST operation in a WLAN. The AP may include a memory to store instructions for performing the first method for SST operation in the WLAN, and a processor communicably coupled with the memory, the processor configured to execute the instructions to perform the first method for SST operation in a WLAN as described in various embodiments of the invention.

Various embodiments of the invention also provide an STA for SST operation in a WLAN. The STA may include a memory to store instructions for performing the second method for SST operation in the WLAN, and a processor communicably coupled with the memory, the processor configured to execute the instructions to perform the second method for SST operation in a WLAN as described in various embodiments of the invention.

Various embodiments of the invention also provide a computer program product comprising instructions to cause a computer to perform any method for SST operation in a WLAN according to any embodiment of the invention, when executed thereon.

Various embodiments of the invention also provide a computer program comprising instructions to cause a computer to perform a method for SST operation in a WLAN according to any embodiment of the invention, when executed thereon.

Various embodiments of the invention also provide a non-volatile storage medium comprising computer program codes to cause a computer to perform a method for SST operation in a WLAN according to any embodiment of the invention, when executed thereon.

Various embodiments of the invention also provide a chip configured to perform a method for SST operation in a WLAN according to any embodiment of the invention.

At least some steps of the methods for SST operation in a WLAN according to any embodiments of the invention described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

It should be noted that the names and order of the fields in the TWT elements or other elements/fields, e.g., the names and order of the fields in the Extended Individual TWT Parameter Set field as shown in FIGS. 8D and 8E, the names and order of the fields in the TWT SST Information field as shown in FIG. 9B, in various embodiments of the invention are for illustration purpose only, not to limit the scope of the invention. In other embodiments, the names and order of the fields may be changed.

As described above, in various embodiments of the invention, during a process of establishing an individual TWT agreement between an STA and an AP through a solicited or unsolicited TWT response, if the SST operation with dynamic puncturing is enabled for the STA and the exact channel puncturing pattern in the subchannel provided to the STA as a temporary channel during a TWT SP is not aligned with the channel puncturing pattern for the operating channel of a BSS with which the STA is associated, the STA is able to determine the exact channel puncturing pattern in the subchannel based on at least one guaranteed non-punctured 20 MHz channel indicated in a TWT element of a TWT response from the AP. Further, the STA may propose at least one guaranteed non-punctured 20 MHz channel by indicating the same in a TWT element of a TWT request to the AP so that the AP may determine the at least one guaranteed non-punctured 20 MHz channel provided to the STA based on the subchannel proposed by the STA. Also, the methods and devices provided in various embodiments are suitable for all three possible SST operation modes, i.e., SST operation mode without puncturing, SST operation with static puncturing, and SST operation with dynamic puncturing. Therefore, an efficient and effective mechanism for resource unit allocation in an EHT PPDU with large bandwidth in a WLAN is provided and the system throughput can be significantly improved.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

What is claimed is:

1. A method for selective subchannel transmission (SST) operation in a wireless local area network (WLAN), the method comprising:

setting, by an access point (AP), a first target wake time (TWT) element of a TWT response to indicate at least one guaranteed non-punctured 20 MHz channel in a subchannel provided to a station (STA) as a temporary channel during a TWT service period (SP), and sending, by the AP, the TWT response to the STA to establish an individual TWT agreement between the AP and the STA;

wherein the setting the first TWT element further comprises: setting, by the AP, a first field in a TWT Parameter Information field of the first TWT element to indicate the at least one guaranteed non-punctured 20 MHz channel in the subchannel provided to the STA;

wherein the method further comprises: setting, by the AP, a second field in the TWT Parameter Information field of the first TWT element to indicate whether the first field is set in the first TWT element;

wherein the setting the second field further comprises: setting, by the AP, the second field in the TWT Parameter Information field of the first TWT element to indicate that the first field is not set in the first TWT element if an SST operation with dynamic puncturing is disabled for the STA;

wherein the setting the second field further comprises: setting, by the AP, the second field to indicate that the first field is not set in the first TWT element if an SST operation with dynamic puncturing is enabled for the STA and any of the following requirements is satisfied:

if the STA is an 80 MHz operating STA, the subchannel provided to the STA as the temporary channel during the TWT SP comprises one punctured 20 MHz channel which is not a non-punctured channel in an operating channel of a 160 MHz BSS or a 320 MHz BSS with which the STA is associated, and if the STA is a 160 MHz operating STA, the subchannel provided to the STA as the temporary channel during the TWT SP comprises one punctured 40 MHz channel which is not a non-punctured channel in an operating channel of a 320 MHz BSS with which the STA is associated.

2. The method according to claim 1, wherein the setting the first TWT element comprises: setting, by the AP, the first field to indicate the at least one guaranteed non-punctured 20 MHz channel in at least one 80 MHz frequency subblock in the subchannel provided to the STA.

3. The method according to claim 1, further comprising: setting, by the AP, a third field in the TWT Parameter Information field of the first TWT element to indicate whether the SST operation with dynamic puncturing is disabled for the STA.

4. The method according to claim 1, further comprising: determining, by the AP, that the SST operation with dynamic puncturing is disabled for the STA if any of the following requirements is satisfied:

neither of the AP nor the STA supports the SST operation with dynamic puncturing, the subchannel provided to the STA as the temporary channel during the TWT SP is a primary channel, if the STA is an 80 MHz operating STA, the subchannel provided to the STA as the temporary channel during the TWT SP is a non-primary channel and comprises one punctured 40 MHz channel which is not a non-punctured channel in an operating channel of a 160 MHz BSS or a 320 MHz BSS with which the STA is associated, and if the STA is a 160 MHz operating STA, the subchannel provided to the STA as the temporary channel during the TWT SP is a non-primary channel and comprises one punctured 40 MHz channel and one punctured 80 MHz channel which are not non-punctured channels in a 320 MHz BSS with which the STA is associated.

5. The method according to claim 1, further comprising: generating, by the AP, a first frame to indicate updated SST operation information for the individual TWT agreement between the AP and the STA, wherein the updated SST operation information comprises at least one updated guaranteed non-punctured 20 MHz channel which will be used in a predetermined subsequent TWT SP, and sending, by the AP, the first frame to the STA.

6. The method according to claim 1, further comprising: receiving, by the AP, a second frame from the STA which indicates proposed updated SST operation information for the individual TWT agreement between the AP and the STA, wherein the proposed updated SST operation information comprises at least one updated guaranteed non-punctured 20 MHz channel which is proposed to be used in a predetermined subsequent TWT SP.

7. The method according to claim 6, wherein the setting the first TWT element further comprises: setting, by the AP, a fourth field in the TWT Parameter Information field of the first TWT element to indicate whether the AP supports reception of the second frame from the STA.

8. The method according to claim 1, further comprising: setting, by the AP, a first capabilities field in a high efficiency (HE) Capabilities element to indicate whether an SST operation without puncturing is supported by the AP; a second capabilities field in an extremely high throughput (EHT) Capabilities element to indicate whether an SST operation with static puncturing is supported by the AP, and a third capabilities field in the EHT Capabilities element to indicate whether an SST operation with dynamic puncturing is supported by the AP.

9. The method according to claim 8, wherein the HE Capabilities element and the EHT Capabilities element are included in a Beacon frame, a Probe Response frame, an Association Response frame or a Reassociation Response frame transmitted by the AP.

10. The method according to claim 8, wherein if the third capabilities field is set to indicate that the SST operation with dynamic puncturing is supported by the AP, the first capabilities field and the second capabilities field are set to indicate that the SST operation without puncturing and the SST operation with static puncturing are supported by the AP respectively; or if the second capabilities field is set to indicate that the SST operation with static puncturing is supported by the AP, the first capabilities field is set to indicate that the SST operation without puncturing is supported by the AP.

11. The method according to claim 1, before setting the first TWT element of the TWT response, further comprising:

receiving, by the AP, a TWT request from the STA to request for establishing the individual TWT agreement between the AP and the STA, wherein the TWT request comprises a second TWT element which is set to indicate at least one guaranteed non-punctured 20 MHz channel in a subchannel proposed by the STA as the temporary channel during the TWT SP, decoding, by the AP, the received TWT request to determine the at least one guaranteed non-punctured 20 MHz channel in the subchannel proposed by the STA, and determining the at least one guaranteed non-punctured 20 MHz channel in the subchannel provided to the STA based on the received TWT request.

12. The method according to claim 11, wherein the decoding the received TWT request comprises: decoding, by the AP, a first field (Guaranteed Channel field) in a TWT Parameter Information field of the second TWT element to determine the at least one guaranteed non-punctured 20 MHz channel in the subchannel proposed by the STA.

13. The method according to claim 12, further comprising: before decoding the first field, decoding, by the AP, a second field (Guaranteed Channel Present field) in the TWT Parameter Information field of the second TWT element to determine whether the first field is set in the second TWT element.

14. The method according to claim 13, further comprising: before decoding the second field, decoding, by the AP, a third field in the TWT Parameter Information field of the second TWT element to determine whether an SST operation with dynamic puncturing is disabled for the STA, wherein the decoding the second field further comprises: decoding, by the AP, the second field if the third field is set to indicate that the SST operation with dynamic puncturing is enabled for the STA.

15. A method for SST operation in a WLAN, the method comprising:

receiving, by an STA, a TWT response from an AP to establish an individual TWT agreement between the AP and the STA, wherein the TWT response comprises a first TWT element which is set to indicate at least one guaranteed non-punctured 20 MHz channel in a subchannel provided to the STA as a temporary channel during a TWT SP, and decoding, by the STA, the received TWT response to determine the at least one guaranteed non-punctured 20 MHz channel in the subchannel provided to the STA;

wherein the method further comprising: before receiving the TWT response from the AP, setting, by the STA, a second TWT element of a TWT request to indicate at least one guaranteed non-punctured 20 MHz channel in a subchannel proposed by the STA as the temporary channel during the TWT SP, and sending, by the STA, the TWT request to the AP to request for establishing the individual TWT agreement between the AP and the STA;

wherein the setting the second TWT element further comprises: setting, by the STA, a first field in a TWT Parameter Information field of the second TWT element to indicate the at least one guaranteed non-punctured 20 MHz channel in the subchannel proposed by the STA;

wherein the setting the second TWT element further comprises: further comprising: setting, by the STA, a second field in the TWT Parameter Information field of the second TWT element to indicate whether the first field is set in the second TWT element;

wherein the setting the second field further comprises: setting, by the STA, the second field in the TWT Parameter Information field of the second TWT element to indicate that the first field is not set in the second TWT element if an SST operation with dynamic puncturing is disabled for the STA;

wherein the setting the second field further comprises: setting, by the STA, the second field in the TWT Parameter Information field of the second TWT element to indicate that the first field is not set in the second TWT element if an SST operation with dynamic puncturing is enabled for the STA and any of the following requirements is satisfied:

if the STA is an 80 MHz operating STA, the subchannel proposed by the STA as the temporary channel during the TWT SP comprises one punctured 20 MHz channel which is not a non-punctured channel in an operating channel of a 160 MHz BSS or a 320 MHz BSS with which the STA is associated, and if the STA is a 160 MHz operating STA, the subchannel proposed by the STA as the temporary channel during the TWT SP comprises one punctured 40 MHz channel which is not a non-punctured channel in an operating channel of a 320 MHz BSS with which the STA is associated.

16. The method according to claim 15, wherein the decoding the first field further comprises: decoding, by the STA, the first field to determine the at least one guaranteed non-punctured 20 MHz channel in at least one 80 MHz frequency subblock in the subchannel provided to the STA.

17. An AP for SST operation in a WLAN, the AP comprising a memory to store instructions for performing a method for SST operation in the WLAN, and a processor communicably coupled with the memory, the processor configured to execute the instructions stored in the memory to perform the method for SST operation in the WLAN, wherein the method comprises:

setting a TWT element of a TWT response to indicate at least one guaranteed non-punctured 20 MHz channel in a subchannel provided to a STA as a temporary channel during a TWT SP, and sending the TWT response to the STA to establish an individual TWT agreement between the AP and the STA;

wherein the setting the first TWT element further comprises: setting a first field in a TWT Parameter Information field of the first TWT element to indicate the at least one guaranteed non-punctured 20 MHz channel in the subchannel provided to the STA;

wherein the method further comprises: setting a second field in the TWT Parameter Information field of the first TWT element to indicate whether the first field is set in the first TWT element;

wherein the setting the second field further comprises: setting the second field in the TWT Parameter Information field of the first TWT element to indicate that the first field is not set in the first TWT element if an SST operation with dynamic puncturing is disabled for the STA; and wherein the setting the second field further comprises: setting the second field to indicate that the first field is not set in the first TWT element if an SST operation with dynamic puncturing is enabled for the STA and any of the following requirements is satisfied:

if the STA is an 80 MHz operating STA, the subchannel provided to the STA as the temporary channel during the TWT SP comprises one punctured 20 MHz channel which is not a non-punctured channel in an operating channel of a 160 MHz BSS or a 320 MHz BSS with which the STA is associated, and if the STA is a 160 MHz operating STA, the subchannel provided to the STA as the temporary channel during the TWT SP comprises one punctured 40 MHz channel which is not a non-punctured channel in an operating channel of a 320 MHz BSS with which the STA is associated.

* * * * *